(12) United States Patent
Lin et al.

(10) Patent No.: US 11,677,586 B1
(45) Date of Patent: Jun. 13, 2023

(54) FAST CONVERGENCE FOR MAC MOBILITY

(71) Applicant: Juniper Networks, Inc., Sunnyvale, CA (US)

(72) Inventors: Wen Lin, Andover, MA (US); Ravi Shekhar, Fremont, CA (US); Vamshi Krishna Voruganti, Cupertino, CA (US); Aldrin Isaac, San Jose, CA (US); SelvaKumar Sivaraj, Sunnyvale, CA (US); Sean A. Mentzer, Bainbridge Island, WA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 42 days.

(21) Appl. No.: 17/443,500

(22) Filed: Jul. 27, 2021

Related U.S. Application Data

(63) Continuation of application No. 16/788,072, filed on Feb. 11, 2020, now Pat. No. 11,088,871.

(Continued)

(51) Int. Cl.
*H04L 12/46* (2006.01)
*H04L 45/50* (2022.01)
(Continued)

(52) U.S. Cl.
CPC .......... *H04L 12/4641* (2013.01); *H04L 12/66* (2013.01); *H04L 45/50* (2013.01); *H04L 61/5007* (2022.05); *H04L 2101/622* (2022.05)

(58) Field of Classification Search
None
See application file for complete search history.

(56) References Cited

U.S. PATENT DOCUMENTS 9,019,973 B1    4/2015  Shukla et al.
9,559,951 B1    1/2017  Sajassi et al.
(Continued)

FOREIGN PATENT DOCUMENTS

WO    WO-2017118880 A1 *  7/2017

OTHER PUBLICATIONS

Jain P., et al., "Generic Overlay OAM and Datapath Failure Detection," Internet Engineering Task Force (IETF), Mar. 6, 2015, 37 pages.

(Continued)

*Primary Examiner* — Kenny S Lin
(74) *Attorney, Agent, or Firm* — Harrity & Harrity, LLP

(57) ABSTRACT

A first provider edge device may receive device information from a second provider edge device included in an Ethernet virtual private network (EVPN). The device information may identify a media access control (MAC) address and may indicate that the device is connected to the second provider edge device. The first provider edge device may receive data transmitted by the device and may determine, based on information included in the data, that the device has moved from the second provider edge device to the first provider edge device. The first provider edge device may generate a data packet including mobility information indicating that the device has moved to the first provider edge device. The first provider edge device may transmit, via a data plane of the EVPN, the data packet to the second provider edge device to permit the second provider edge device to update routing information for the device.

20 Claims, 13 Drawing Sheets

Related U.S. Application Data

(60) Provisional application No. 62/955,986, filed on Dec. 31, 2019.

(51) Int. Cl.
  *H04L 12/66* (2006.01)
  *H04L 61/5007* (2022.01)
  *H04L 101/622* (2022.01)

(56) References Cited

U.S. PATENT DOCUMENTS

| | | |
|---|---|---|
| 11,088,871 B1 | 8/2021 | Lin et al. |
| 2015/0236900 A1 | 8/2015 | Chung |
| 2016/0134525 A1 | 5/2016 | Zhang et al. |
| 2016/0211989 A1* | 7/2016 | Jain .................. H04L 43/10 |
| 2016/0277210 A1 | 9/2016 | Lin et al. |
| 2017/0250904 A1 | 8/2017 | Singarayan et al. |
| 2017/0317919 A1* | 11/2017 | Fernando ............. H04L 41/40 |
| 2017/0373973 A1 | 12/2017 | Bickhart et al. |
| 2018/0091445 A1 | 3/2018 | Singh et al. |
| 2018/0309691 A1* | 10/2018 | Malhotra ............. H04L 47/34 |
| 2018/0331953 A1 | 11/2018 | Hoang et al. |
| 2019/0245779 A1 | 8/2019 | Jonnalagadda et al. |
| 2019/0356599 A1 | 11/2019 | Brissette et al. |
| 2020/0014557 A1 | 1/2020 | Wang et al. |
| 2020/0014623 A1 | 1/2020 | Wang et al. |
| 2020/0322268 A1 | 10/2020 | Thoria et al. |

OTHER PUBLICATIONS

Sajassi A., et al., "RFC 7432—BGP MPLS-Based Ethernet VPN," Internet Engineering Task Force (IETF), Feb. 2015, 56 pages, XP055303848. [retrieved on Sep. 19, 2016] Retrieved from the Internet [URL: https://tools.ietf.org/html/rfc7432].

Singh K., et al., VxLAN Router Alert Option, Internet Engineering Task Force (IETF), May 24, 2013, 12 pages.

\* cited by examiner

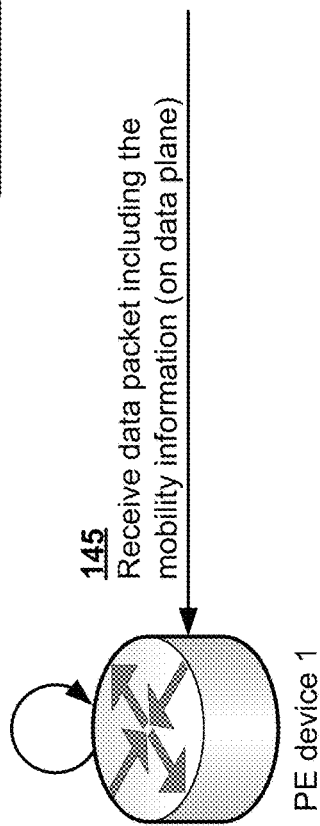

FIG. 1F

| MAC TABLE (PE Device 1) | | | | |
|---|---|---|---|---|
| EVI | MAC Address | PE device | ESI | Sequence Number |
| | | ... | | |

145 Receive data packet including the mobility information (on data plane)

150
- Parse data packet that includes the mobility information to determine MAC address and sequence number of the end point device
- Determine, based on the MAC address and the sequence number, that the end point device has moved from PE device 1 to PE device 2
- Store updated routing information for the end point device PE device 1

100

400 ⟶

402 — Receive, by a first provider edge device included in an Ethernet virtual private network (EVPN), device information from a second provider edge device included in the EVPN, the device information identifying a media access control (MAC) address, a sequence number associated with the MAC address, and an Ethernet segment associated with the second provider edge device, the device information indicating that a device, associated with the MAC address and the sequence number, is connected to the second provider edge device, and the device information being received via a control plane of the EVPN

404 — Receive, via an access interface associated with the EVPN, data transmitted by the device, the data being received via a data plane of the EVPN

406 — Determine, based on information included in the data, that the data is associated with the MAC address and the sequence number

408 — Determine that the device has moved from the second provider edge device to the first provider edge device based on the data being associated with the MAC address and the sequence number

410 — Generate a data packet including mobility information, the mobility information indicating that the device has moved to the first provider edge device

412 — Transmit the data packet to the second provider edge device via the data plane.

FIG. 4

FAST CONVERGENCE FOR MAC MOBILITY

RELATED APPLICATION

This application is a continuation of U.S. patent application Ser. No. 16/788,072, filed Feb. 11, 2020 (now U.S. Pat. No. 11,088,871), which claims priority under 35 U.S.C. § 119 to U.S. Provisional Patent Application No. 62/955,986, filed on Dec. 31, 2019, the contents of which are incorporated herein by reference in their entireties.

BACKGROUND

An Ethernet virtual private network (EVPN) enables a group of dispersed customer sites to be connected using a Layer 2 virtual bridge. An EVPN may include customer edge (CE) devices (e.g., hosts, routers, switches, or the like) connected to provider edge (PE) devices. In some cases, a CE is multi-homed with two or more PEs on the EVPN.

SUMMARY

According to some implementations, a method may include receiving, by a first provider edge device included in an Ethernet virtual private network (EVPN), device information from a second provider edge device included in the EVPN, the device information identifying a media access control (MAC) address, a sequence number associated with the MAC address, an Ethernet Tag identifying a virtual local area network (VLAN) (0 for VLAN-based and VLAN-bundle and non-zero for VLAN-aware mode), and an Ethernet segment associated with the second provider edge device, the device information indicating that a device, associated with the MAC address and the sequence number, is connected to the second provider edge device, and the device information being received via a control plane of the EVPN (e.g., in accordance with RFC 7432); receiving, at the first provider edge device and via an access port associated with the EVPN, data transmitted by the device, the data being received via a data plane of the EVPN; determining, by the first provider edge device and based on information included in the data, that the data is associated with the MAC address and the sequence number; determining, by the first provider edge device, that the device has moved from the second provider edge device to the first provider edge device based on the data being associated with the MAC address and the sequence number; quickly generating, by the first provider edge device, a data packet including mobility information, the mobility information indicating that the device has moved to the first provider edge device; and transmitting, by the first provider edge device, the data packet to the second provider edge device via the data plane.

According to some implementations, a first provider edge device may be included in an EVPN. The first provider edge device may comprise one or more memories and one or more processors. The one or more processors may: receive device information from a second provider edge device included in the EVPN, the device information identifying a media access control (MAC) address and a sequence number associated with the MAC address, and the device information indicating that a device, associated with the MAC address and the sequence number, is connected to the second provider edge device; receive, via an access interface associated with the EVPN, data transmitted by the device, the data being received via a data plane of the EVPN; determine, based on information included in the data, that the data is associated with the MAC address and the sequence number; determine that the device has moved from the second provider edge device to the first provider edge device based on the data being associated with the MAC address and the sequence number; quickly generate a data packet including mobility information, the mobility information indicating that the device has moved to the first provider edge device; and transmit, via the data plane, the data packet to the second provider edge device to permit the second provider edge device to update routing information associated with the device.

According to some implementations, a non-transitory computer-readable medium may store one or more instructions. The one or more instructions, when executed by one or more processors of a provider edge device, may cause the one or more processors to: transmit device information to a second provider edge device included in the EVPN, the device information identifying a media access control (MAC) address and a sequence number associated with the MAC address, and the device information indicating that a device, associated with the MAC address and the sequence number, is connected to the first provider edge device; receive a data packet including mobility information associated with the device, the mobility information indicating that the device has moved from the first provider edge device to the second provider edge device, and the data packet being received via a data plane of the EVPN; determine that the device has moved to the second provider edge device based on the mobility information; and update routing information associated with the device based on determining that the device has moved to the second provider edge device.

BRIEF DESCRIPTION OF THE DRAWINGS

FIGS. 1A-1G are diagrams of one or more example implementations described herein.

FIG. 4 is a flowchart of an example process for updating routing information based on determining that an end point device has moved from a first provider edge device to a second provider edge device.

DETAILED DESCRIPTION

Figure 1A:
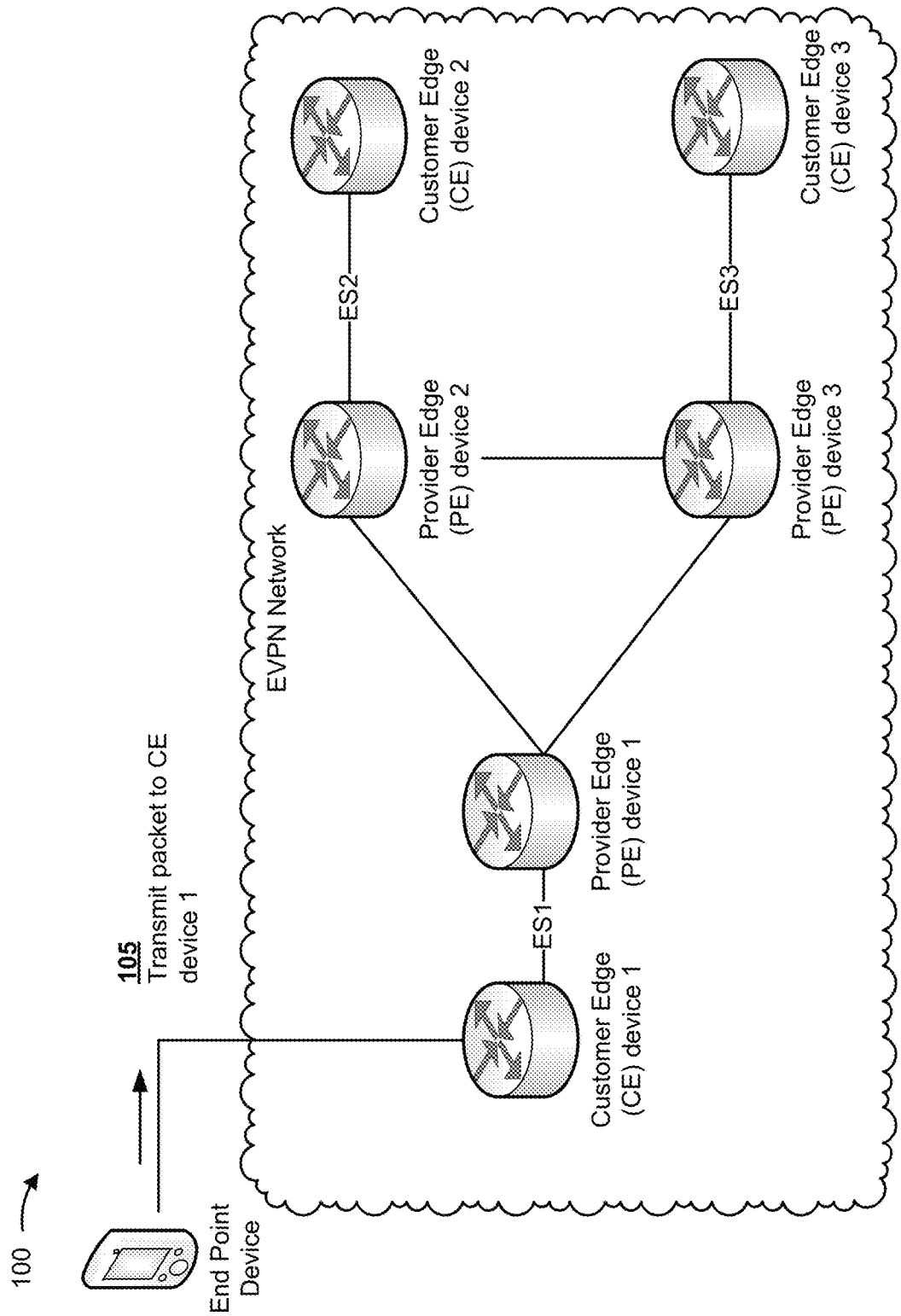

The following detailed description of example implementations refers to the accompanying drawings. The same reference numbers in different drawings may identify the same or similar elements.

An Ethernet virtual private network (VPN) (EVPN) is a standards-based technology that provides virtual multipoint bridged connectivity between different Layer 2 domains over an Internet protocol (IP) or an IP/multiprotocol label switching (MPLS) backbone network. Like other VPN technologies, such as IP VPN and virtual private local area network (LAN) service (VPLS), EVPN instances are configured on provider edge (PE) devices (e.g., routers, switches, and/or the like) to maintain logical service separation between customer end point devices. The PE devices connect to customer edge (CE) devices (e.g., routers, switches, host devices, and/or the like). The PE devices exchange reachability information using multiprotocol border gateway protocol (MP-BGP), and encapsulated traffic is forwarded between the PE devices.

In an EVPN, a PE device forwards a packet that the PE device receives based on a destination MAC address included in a header of the packet. To be able to forward the packet, the PE device needs to have previously learned how to reach the destination MAC address. The destination MAC address may be a local MAC address or a remote MAC address. A local MAC address refers to a MAC address that: belongs to a CE device connected to the PE device (referred to herein as a "local CE device"); or belongs to a device that is behind a local CE device (e.g., a MAC address of an end point device connected to the local CE device). A remote MAC address refers to a MAC address that belongs to, or is behind, a CE device that is not connected to the PE device (referred to herein as a "remote CE device").

The process of learning how to reach a given MAC address is referred to herein as MAC address learning. MAC address learning may have two components: local learning and remote learning. Local learning refers to a process employed by a particular PE device to learn local MAC addresses. Local learning occurs on the data plane using, for example, data-plane learning, IEEE 802.1x, the Link Layer Discovery Protocol (LLDP), IEEE 802.1aq, Address Resolution Protocol (ARP), and/or the like. Upon learning a local MAC address, the particular PE device may store routing information associated with the local MAC address. Additionally, the particular PE device may send a route advertisement message to other PE devices in the EVPN. The route advertisement message may be transmitted via the control plane and may include the local MAC address and information indicating that the local MAC address can be reached via the particular PE device.

Remote learning refers to a process employed by a particular PE device to learn remote MAC addresses. Currently, remote learning occurs by receiving a route advertisement message from another PE device via the control plane. The route advertisement message may include a MAC address and information indicating that a device, associated with the MAC address, can be reached via the other PE device. Upon learning a remote MAC address, the particular PE device may store routing information associated with the remote MAC address.

In some instances, a device attached, either directly or indirectly, to a PE device can move from one PE device to another PE device while maintaining the same MAC address. For example, a device may initially attach, either directly or indirectly, to a first PE device. The first PE device may perform local learning to learn a MAC address associated with the device. The first PE device may store routing information for the device and transmit, via the control plane, a first route advertisement message to a second PE device in the EVPN. The second PE device, based on receiving the first route advertisement message, may store routing information for the device indicating that the device is reachable via the first PE device. Subsequently, the second PE device may determine that the device has moved from the first PE device to the second PE device. The second PE device may store updated routing information for the device. The updated routing information may indicate that the device is now reachable via the second PE device.

Additionally, the second PE device may send a second route advertisement message to other PE devices in the EVPN. The second route advertisement message may be transmitted via the control plan and may include the MAC address and information indicating that the device is now reachable via the second PE device. Based on receiving the second route advertisement message, each of the other PE devices may update that PE device's routing information for the device to indicate that the device is now reachable via the second PE device. Additionally, the first PE device may transmit a withdrawal of the first route advertisement message to the other PE devices in the EVPN via the control plane. Each of the PE devices in the EVPN may begin forwarding traffic for the device via the second PE device upon receiving both the second route advertisement message and the withdrawal of the first route advertisement message.

As discussed above, the process for updating routing information for a device moving from the first PE device to second PE device is performed using messages transmitted via the control plane of the EVPN. Depending on the number of devices moving from one PE device to another PE device, a scale of the EVPN network, and/or other characteristics of the EVPN network, the propagation of these messages via the control plane may take a significant amount of time (e.g., on the order of seconds). During the amount of time it takes one of the other PE devices in the EVPN to receive these messages, the other PE device may receive a packet that is to be forwarded to the device. Because the other PE device has not yet received both the second route advertisement message and the withdrawal of the first route advertisement message, the packet may be dropped and/or forwarded to the first PE device based on stale or outdated routing information.

In cases where the packet is dropped, a device from which the packet originated may be required to re-transmit the packet. The re-transmitting of the packet may result in the device that re-transmits the packet, as well as the devices that receive the re-transmitted packet (e.g., the other PE device), expending additional computing resources (e.g., processing resources, memory resources, and/or communication resources). Similarly, forwarding the packet to the first PE device rather than the second PE device, may cause the first PE device to waste computing resources (e.g., processing resources, memory resources, and/or communication resources) forwarding the packet to the second PE device or dropping the packet. Further, the re-transmission of the packet and the forwarding of the packet from the first PE device to the second PE device results in an increase in the number of packets being transmitted through the EVPN, thereby increasing network congestion. Increased network congestion may result in a failure to meet certain quality of service requirements.

According to some implementations described herein, a PE device included in an EVPN may perform a fast convergence process. Convergence refers to a state of a set of network devices (e.g., PE devices in the EVPN) that have the same topological information about a network in which the set of network devices operate (e.g., the EVPN). For a set of network devices to have converged, the set of network devices may have collected available topology information from each other via an implemented routing protocol, the topology information each network device collected may not contradict the topology information of any other network device included in the set of network devices, and the topology information may reflect the topology of the network.

In some implementations, a device may initially attach, either directly or indirectly, to a first PE device of an EVPN. The first PE device may perform local learning to learn a MAC address associated with the device. The first PE device may store routing information for the device and transmit a first route advertisement message, via a control plane, to other PE devices, including a second PE device, in the EVPN. The second PE device, based on receiving the first route advertisement message, may store routing information for the device indicating that the device is reachable via the first PE device.

Upon determining that the device has moved to the second PE device from the first PE device, the second PE device may store updated routing information for the device and may transmit a second route advertisement message to the other PE devices, including the first PE device, in the EVPN. The second route advertisement message may be transmitted via the data plane, and not the control plane, and may include the updated routing information indicating that the device can now be reached via the second PE device. Based on receiving the second route advertisement message on the data plane, each of the other PE devices in the EVPN may update that PE device's routing information for the device. Further, each of the other PE devices in the EVPN may begin forwarding packets destined for the device based on the updated routing information without waiting to receive a withdrawal of the first route advertisement message from the first PE device.

Because the updated routing information is transmitted via the data plane, the updated routing information may be propagated through the EVPN faster than if the updated routing information is transmitted via the control plane. Additionally, because each of the other PE devices in the EVPN may begin forwarding packets destined for the device based on the updated routing information without waiting to receive a withdrawal of the first route advertisement message, the amount of time for each of the other PE devices to begin forwarding packets destined for the device based on the updated routing information is further reduced than if the other PE devices waited to receive the withdrawal of the first route advertisement message from the first PE device.

In this way, the updated routing information can be quickly propagated throughout the EVPN thereby reducing the amount of time in which the convergence process is completed (e.g., on the order of sub-seconds rather than seconds). The reduction in the amount of time in which the convergence process is completed may result in a reduced chance of a packet being dropped and/or forwarded to the wrong PE device as a result of a PE device having stale or incorrect routing information. A reduction in the chance of a packet being dropped and/or forwarded to the wrong PE device may conserve computing resources (e.g., processing resources, memory resources, and/or communication resources) that would otherwise have been used to re-transmit and/or forward the packet to the correct PE device. A reduction in the chance of a packet being dropped and/or forwarded to the wrong PE device may prevent an increase in network congestion that would otherwise have occurred as a result of additional transmissions of the packet. The prevention of an increase in network congestion may allow various quality of service requirements to be met and/or maintained in the network, thereby improving the operation of the network.

FIGS. 1A-1G are diagrams of one or more example implementations 100 described herein. As shown in FIGS. 1A-1G, example implementation(s) 100 may include an end point device connected to an EVPN that includes multiple CE devices (shown as CE devices 1, 2, and 3), and multiple PE devices (shown as PE devices 1, 2, and 3). While some implementations are described herein in the context of a single end point device attached to a single CE device attached to a single PE device, in practice, these implementations apply to a plurality of end point devices connected to a plurality of CE devices that are each connected to one or more PE devices. In practice, the EVPN may include tens, hundreds, thousands, or more CE devices and/or tens, hundreds, thousands, or more PE devices, and/or there may be hundreds, thousands, millions, or more end point devices connected to the EVPN.

As shown in FIG. 1A, in some implementations, CE devices 1-3 may be connected to PE devices 1-3, respectively, and may form the EVPN network. In some implementations, the PE devices 1-3 may be interconnected by a multiprotocol label switching (MPLS) label switched path (LSP). Additionally, or alternatively, the PE devices 1-3 may be interconnected by an Internet protocol (IP) infrastructure.

In some implementations, the CE device 1 may be connected to the PE device 1 via a first Ethernet segment (e.g., ES1), the CE device 2 may be connected to the PE device 2 via a second Ethernet segment (e.g., ES2), and the CE device 3 may be connected to the PE device 3 via a third Ethernet segment (e.g., ES3). The first, second, and third Ethernet segments may each comprise a set of one or more Ethernet links capable of transmitting data between CE device 1 and PE device 1, CE device 2 and PE device 2, and CE device 3 and PE device 3, respectively.

In some implementations, the end point device may initially connect, either directly or indirectly, to the CE device 1 to send or receive traffic via the EVPN. In some implementations, the end point device may connect to the CE device 1 via a wireless connection. For example, the end point device may be a mobile device, such as, for example, a smart phone, and may wirelessly connect to the CE device 1 via a wireless access point. In some implementations, the end point device may connect to the CE device 1 via a wired connection. For example, the end point device may be a stationary device, such as, for example, a desktop computer, and may connect to the CE device 1 via a wired access point, such as a modem or a router. In some implementations, the end point device may connect to the CE device 1 via a combination of a wired connection and a wireless connection. For example, the end point device may be a mobile device that has a wireless connection to a wireless access point, which has a wired connection to the CE device 1 or another device that connects to the CE device 1.

As shown in FIG. 1A, and by reference number 105, the end point device may transmit a packet to CE device 1. For example, a user of the end point device may wish to establish a communication session with another end point device (not shown) that is accessible via the EVPN. The user may instruct the end point device to establish the communication session and the end point device may connect to the CE device 1 by sending a packet to the CE device 1.

Figure 1B:
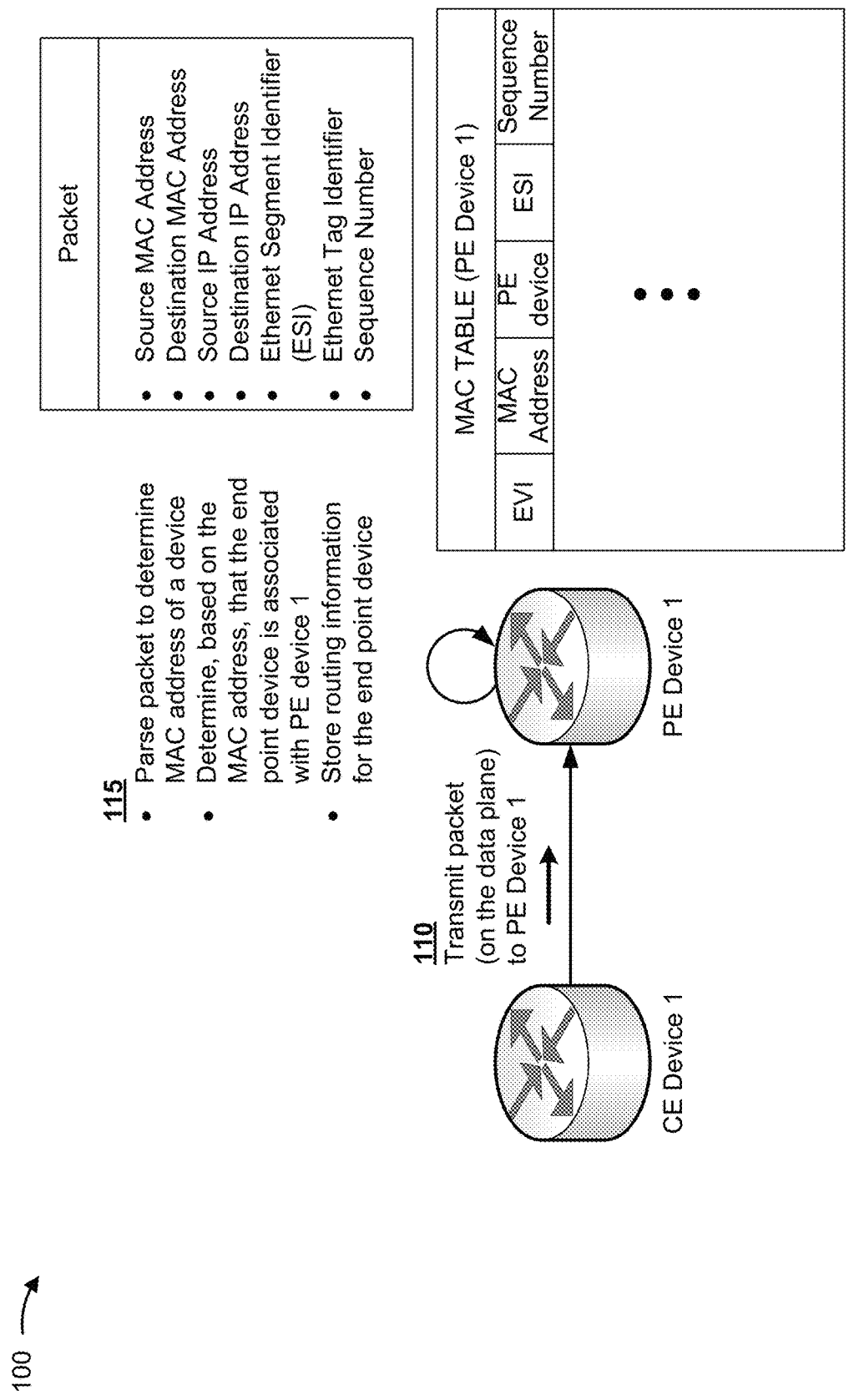

As shown in FIG. 1B, and by reference number 110, the CE device 1 may transmit a packet to PE device 1 via a data plane of the EVPN. For example, after a connection is established between the end point device and the CE device 1, the end point device may transmit a packet to the CE device 1. The packet may have a destination address corresponding to a MAC address of the other end point device.

The CE device 1 may receive the packet and forward the packet to the PE device 1 via the data plane of the EVPN.

In some implementations, the PE device 1 may perform local learning to learn a MAC address of the end point device based on receiving the packet from the CE device 1. As shown in FIG. 1B, and by reference number 115, the PE device 1 may parse the packet received from the CE device 1 to determine a MAC address of the end point device. For example, the PE device 1 may parse the packet and determine a source MAC address included in a header of the packet.

As also shown in FIG. 1B, and by reference number 115, the PE device 1 may determine that the end point device is associated with the PE device 1. In some implementations, the PE device 1 may determine that the end point device is associated with the PE device 1 based on receiving the packet from the CE device 1. For example, the PE device 1 may determine that the packet was received via a port associated with the CE device 1. The PE device 1 may determine that the end point device is associated with the PE device 1 based on the packet being received via the port associated with the CE device 1.

Additionally, or alternatively, the PE device 1 may determine that the end point device is associated with the PE device 1 based on comparing the source MAC address included in the header of the packet with MAC addresses stored in a memory associated with the PE device 1. For example, the PE device 1 may compare the source MAC address with MAC addresses stored in a data structure, such as a MAC table stored in a memory of the PE device 1. The PE device 1 may determine that the source MAC address does not match any of the MAC addresses stored in the MAC table. The PE device 1 may determine that the end point is device is associated with the PE device 1, and not another PE device included in the EVPN, based on determining that the source MAC address does not match any of the MAC addresses stored in the MAC table.

In some implementations, the MAC table may include a set of one or more entries. Each entry may include routing information for a respective device. For example, each entry included in the MAC table may include: an EVPN identifier (EVI) identifying the EVPN, a MAC address associated with a device associated with that entry, a PE device through which the device can be reached, an Ethernet segment identifier, and/or a sequence number associated with the MAC address.

As further shown in FIG. 1B, and by reference number 115, the PE device 1 may store routing information for the end point device. In some implementations, the PE device 1 may store the routing information for the device in the MAC table. For example, the PE device 1 may generate an entry for the end point device in the MAC table and may store an EVPN identifier identifying the EVPN, the source MAC address, information identifying the PE device 1 as the PE device through which the end point device can be reached, an Ethernet segment identifier (ESI) identifying the Ethernet segment connecting the CE device 1 to the PE device 1, an Ethernet Tag identifying the VLAN (0 for VLAN-based and VLAN-bundle and non-zero for VLAN-aware mode), and/or a sequence number associated with the source MAC address. In some implementations, because the source MAC address did not match a MAC address previously stored in the MAC table, the sequence number associated with the source MAC address may be set to a particular value, such as zero.

Figure 1C:
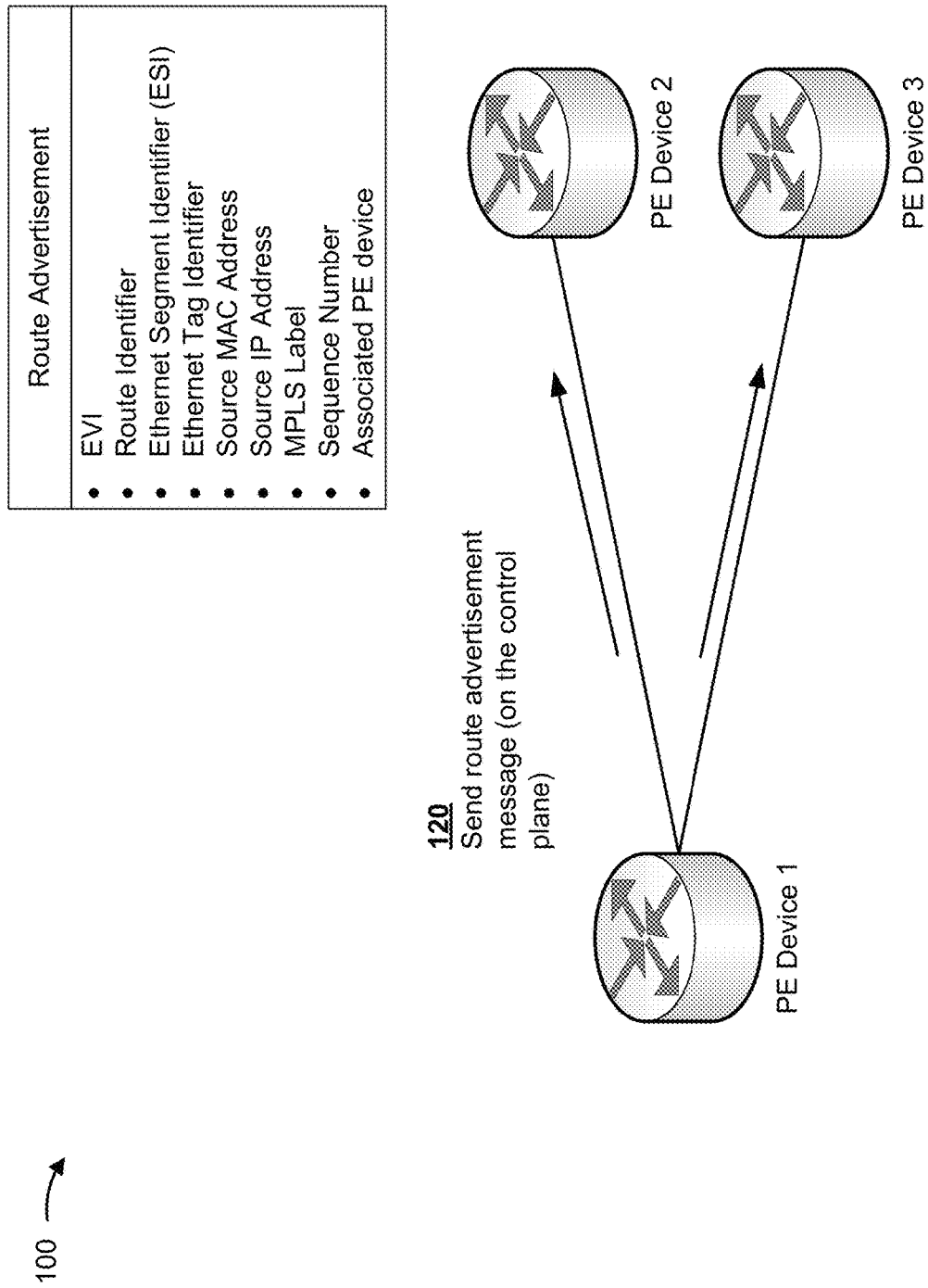

In some implementations, the PE device 1 may advertise the learned MAC address (e.g., the source MAC address included in the header of the packet) to the other PE devices included in the EVPN. For example, as shown in FIG. 1C, and by reference number 120, the PE device 1 may send a route advertisement message to the PE devices 2 and 3 via a control plane of the EVPN.

In some implementations, the route advertisement message may include the Ethernet identifier, a route identifier, the source MAC address, a source IP address of the end point device, an MPLS label, an Ethernet segment identifier identifying the Ethernet segment connecting the CE device 1 to the PE device 1, an Ethernet tag identifier, a sequence number, and/or information identifying the PE device 1 as the PE device through which a device associated with the source MAC address (e.g., the end point device) can be reached. In some implementations, the route advertisement message may be an EVPN network layer reachability information (NLRI) message having route type field set to 2 to indicate a MAC/IP advertisement route type.

In some implementations, each of the PE devices to which the route advertisement message was sent may receive and perform remote learning to learn the MAC address included in the route advertisement message. For example, the PE device 2 (and/or the PE device 3) may receive and process the route advertisement message to determine that the end point device can be reached via the PE device 1. In some implementations, the PE device 2 (and/or the PE device 3) may store routing information indicating that a device associated with the MAC address can be reached via the PE device 1.

For example, the PE device 2 (and/or the PE device 3) may compare the MAC address included in the route advertisement message to MAC addresses stored in a data structure, such as a MAC table stored in a memory associated with the PE device 2. The PE device 2 (and/or the PE device 3) may determine that the determined MAC address included in the route advertisement message does not match any of the MAC addresses stored in the MAC table. The PE device 2 (and/or the PE device 3) may create a new entry in the MAC table based on the MAC address included in the route advertisement message not matching any of the stored MAC addresses and may store information indicating that a device associated with the MAC address included in the route advertisement message (e.g., the end point device) may be reached via the PE device 1 in the newly created entry.

Figure 1D:
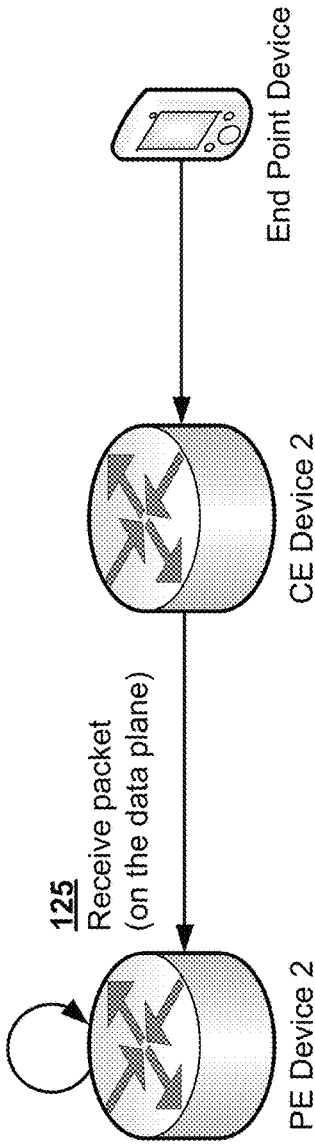

In some implementations, as shown in FIG. 1D, the end point device may move from the PE device 1 to the PE device 2 while maintaining the same MAC address. For example, while using the end point device to communicate with another end point device, the user of the end point device may move from a location near the CE device 1 to a location near the CE device 2. As the user, and therefore the end point device, move away from the CE device 1 and towards the CE device 2, the end point device may connect to the CE device 2 and disconnect from the CE device 1 while maintaining the same MAC address. In some implementations, the end point device may disconnect from CE device 1 before connecting with CE device 2. In some implementations, the end point device may maintain a connection with CE device 1 until a connection is established with CE device 2. After connecting to the CE device 2, the end point device may transmit data to the other end point device via the CE device 2.

In some implementations, as shown in FIG. 1D and by reference number 130, the PE device 2 may receive a packet from the CE device 2 via the data plane of the EVPN. For example, after a connection is established between the end point device and the CE device 2, the end point device may transmit a packet to the CE device 2. The packet may have a destination address corresponding to a MAC address of the other end point device. The CE device 2 may receive the packet and forward the packet to the PE device 2 via the data plane of the EVPN.

In some implementations, the PE device 2 may perform local learning to learn a MAC address of the end point device based on receiving the packet from the CE device 2. As shown in FIG. 1D, and by reference number 130, the PE device 2 may parse the packet received from the CE device 2 to determine a MAC address of the end point device. For example, the PE device 2 may parse the packet and determine a source MAC address included in a header of the packet.

As also shown in FIG. 1D, and by reference number 130, the PE device 2 may determine that the end point device has moved from the PE device 1 to the PE device 2. In some implementations, the PE device 2 may determine that the end point device is associated with the PE device 2 based on receiving the packet from the CE device 2. For example, the PE device 2 may determine that the packet was received via a port associated with the CE device 2. The PE device 2 may determine that the end point device is associated with the PE device 2 based on the packet being received via the port associated with the CE device 2.

In some implementations, the PE device 2 may determine that the end point device was previously associated with the PE device 1 based on comparing the source MAC address included in the header of the packet with MAC addresses stored in a memory associated with the PE device 2. For example, the PE device 2 may compare the source MAC address with MAC addresses stored in a data structure, such as a MAC table stored in a memory of the PE device 2. The PE device 2 may determine that the source MAC address matches a MAC address included in a particular entry of the MAC table.

In some implementations, the particular entry may include information indicating that the end point device can be reached via the PE device 1. The PE device 2 may determine that the end point device was previously associated with the PE device 1 based on the particular entry including information indicating that the end point device can be reached via the PE device 1. The PE device 2 may determine that the end point device has moved from the PE device 1 to the PE device 2 based on determining that the end point device is associated with the PE device 2 and that the end point device was previously associated with the PE device 1.

In some implementations, as further shown in FIG. 1D, and by reference number 130, the PE device 2 may store updated routing information for the end point device and may increase a sequence number value of the end point device. For example, the PE device 2 may store the updated routing information for the device in the MAC table. For example, the PE device 2 may generate a new entry for the end point device in the MAC table and may store an EVPN identifier identifying the EVPN, the MAC address of the end point device, information identifying the PE device 2 as the PE device through which the end point device can be reached, and/or an Ethernet segment identifier (ESI) identifying the Ethernet segment connecting the CE device 2 to the PE device 2. Additionally, the PE device 2 may determine a sequence number stored in the particular entry of the MAC table. The PE device 2 may increase a value of the sequence number to generate a modified sequence number and may store the modified sequence number in the new entry created in the MAC table as part of the updated routing information. In some implementations, the PE device 2 may increase the sequence number by a particular value, such as one.

In some implementations, rather than generating a new entry in the MAC table, the PE device 2 may modify an existing entry for the end point device in the MAC table. In this case, the PE device 2 may update, in the MAC table, the information identifying the PE device 1 as the PE device through which the end point device can be reached with information identifying the PE device 2 as the PE device through which the end point device can be reached, and/or the Ethernet segment identifier (ESI) identifying the Ethernet segment connecting the CE device 1 to the PE device 1 with an Ethernet segment identifier (ESI) identifying the Ethernet segment connecting the CE device 2 to the PE device 2. Additionally, the PE device 2 may modify the value of the sequence number, as described above.

Figure 1E:
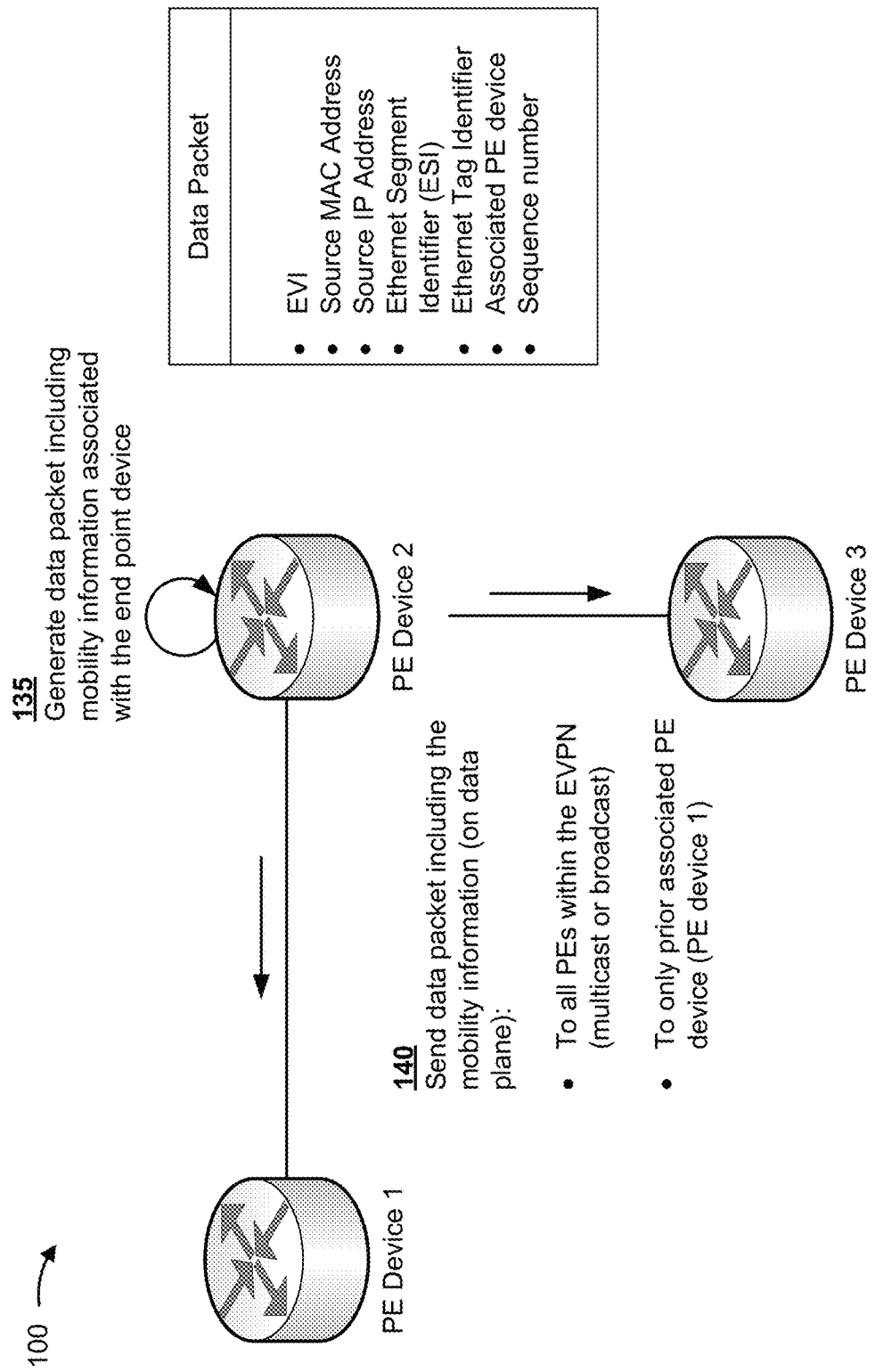

In some implementations, as shown in FIG. 1E, and by reference number 135, the PE device 2 may generate a data packet including mobility information associated with the end point device. For example, the PE device 2 may generate a data packet including information indicating that the end point device has moved from the PE device 1 to the PE device 2 while maintaining the same MAC address.

In some implementations, the data packet may include the Ethernet identifier, the MAC address of the end point device, a source IP address of the end point device, an Ethernet segment identifier identifying the Ethernet segment connecting the CE device 2 to the PE device 2, information identifying the PE device 2 as the PE device through which a device associated with the MAC address (e.g., the end point device) can be reached, and/or the modified sequence number.

In some implementations, the data packet may have a format corresponding to an Operations, Administration, and Maintenance (OAM) packet defined for an EVPN overlay. The OAM packet may include a router alert bit. In some implementations, the PE device 2 may set the router alert bit to prevent a provider edge device to which the OAM packet is sent from forwarding the OAM packet via the Ethernet segment associated with the provider edge device (e.g., to a CE device connected to the PE device).

In some implementations, the data packet may include mobility information for a plurality of end point devices. For example, based on determining that the end point device has moved from the PE device 1 to the PE device 2, the PE device 2 may initiate a timer to determine if another end point device also moves from one of the other PE devices (e.g., the PE device 1 or 3) to the PE device 2 prior to the expiration of the timer.

In some implementations, prior to the expiration of the timer, the PE device 2 may determine, in a manner similar to that described above in connection with FIG. 1D, that one or more other end point devices have moved from one of the PE devices in the EVPN (e.g., the PE device 1 an/or 3) to the PE device 2. The PE device 2 may generate the data packet to include the mobility information for the end point device and mobility information for each of the one or more other end point devices based on determining that the one or more other end point devices have moved to the PE device 2 prior to the expiration of the timer (e.g., within a particular period of time). The mobility information, for one of the one or more other end point devices, may include information indicating that the one of the one or more other end point devices has moved from one of the other PE devices in the EVPN to the PE device 2. By providing mobility information, for a plurality of end point devices that have moved, in a single data packet, the PE device 2 conserves computing resources (e.g., processing resources, memory resources, communication resources, and/or the like) and network resources that would have otherwise been used to send separate data packets for the plurality of end point devices.

In some implementations, the PE device 2 may transmit, via a data plane of the EVPN, the data packet to one or more of the other PE devices included in the EVPN. For example, as shown in FIG. 1E, and by reference number 140, the PE device 2 may send the data packet including the mobility information for the end point device to the PE devices 1 and/or 3 via a data plane of the EVPN.

In some implementations, the PE device 2 may send, via the data plane, the data packet to only the PE device from which the end point device has moved. For example, the PE device 2 may unicast the data packet to the PE device 1 via the data plane of the EVPN. In these implementations, the PE device from which the end point has moved (e.g., PE device 1) forwards a data packet received from the local CE device to the PE device to which the end point device has moved (e.g., PE device 2) if the data packet has a destination MAC address set to the moved MAC address that was notified by the PE device to which the end point has moved and if the moved MAC address is not timed out. By sending the data packet to only the PE device from which the end point device has moved, the PE device 2 conserves computing resources and network resources that would otherwise have been used to transmit the data packets to all the other PE devices in the EVPN. A reduction in the number of data packets transmitted via the data plane may allow various quality of service requirements to be met and/or maintained, thereby improving the operation of the network.

In some implementations, the PE device 2 may send, via the data plane, the data packet to a plurality of other PE devices included in the EVPN. For example, the PE device 2 may multicast or broadcast, via the data plane, the data packet to all of the PE devices included in the EVPN (e.g., the PE devices 1 and 3). Because the updated routing information is transmitted to all of the PE devices included in the EVPN via the data plane, an amount of time for propagating the updated routing information through the EVPN may be reduced compared to an amount of time for propagating the updated routing information via the control plane.

The reduction in the amount of time for propagating the updated routing information may result in a reduced chance of a packet being dropped and/or forwarded to the wrong PE device as a result of a PE device having stale or incorrect routing information. A reduction in the chance of a packet being dropped and/or forwarded to the wrong PE device conserves computing resources and network resources that would otherwise have been used to re-transmit and/or forward the packet to the correct PE device. A reduction in the chance of a packet being dropped and/or forwarded to the wrong PE device may prevent an increase in network congestion that would otherwise have occurred as a result of additional transmissions of the packet. The prevention of an increase in network congestion may allow various quality of service requirements to be met and/or maintained in the network, thereby improving the operation of the network.

In some implementations, the PE device 2 may send the data packet after the expiration of a predetermined period of time. For example, based on determining that the end point device has moved from the PE device 1 to the PE device 2, the PE device 2 may initiate a timer to determine if another end point device moves from one of the other PE devices (e.g., the PE device 1 or 3) to the PE device 2 prior to the expiration of the timer. The PE device 2 may send, via the data plane, the data packet to one or more of the other PE devices in the EVPN based on an expiration of the timer.

In some implementations, each of the PE devices to which the data packet was sent may receive the data packet via the data plane of the EVPN and may process the data packet to determine that the end point device has moved from the PE device 1 to the PE device 2. For example, the PE device 1 (and/or the PE device 3) may receive the data packet via the data plane of the EVPN. The PE device 1 (and/or the PE device 3) may process the data packet to determine mobility information for the end point device. For example, as shown in FIG. 1F, and by reference number 150, the PE device 1 may parse the data packet to determine the MAC address and the modified sequence number associated with the end point device.

In some implementations, the PE device 1 (and/or the PE device 3) may determine that the end point device has moved from the PE device 1 to the PE device 2 based on the mobility information included in the data packet. For example, as also shown in FIG. 1F, and by reference number 150, the PE device 1 may determine that the end point device has moved from the PE device 1 to the PE device 2 based on the MAC address and the modified sequence number.

In some implementations, the PE device 1 (and/or the PE device 3) may determine that the end point device was previously associated with the PE device 1 based on comparing the MAC address included in the data packet with MAC addresses stored in a memory associated with the PE device 1. For example, the PE device 1 may compare the MAC address included in the data packet with MAC addresses stored in a data structure, such as a MAC table stored in a memory of the PE device 1. The PE device 1 may determine that the MAC address included in the data packet matches a MAC address included in a particular entry of the MAC table.

In some implementations, the particular entry may include information indicating that the end point device can be reached via the PE device 1. The PE device 1 may determine that the end point device was previously associated with the PE device 1 based on the particular entry including information indicating that the end point device can be reached via the PE device 1.

In some implementations, the PE device 1 may determine that the end point device has moved from the PE device 1 to the PE device 2 based on the particular entry including information indicating that the end point device can be reached via the PE device 1 and/or based on the modified sequence number included in the data packet. For example, the particular entry may also include a sequence number and the PE device 1 may compare the sequence number included in the particular entry with the modified sequence number included in the data packet. The PE device 1 may determine that the end point device has moved from the PE device 1 to the PE device 2 based on a result of the comparison.

In some implementations, the PE device 1 may determine that the end point device has moved from the PE device 1 to the PE device 2 based on comparing a value of the sequence number included in the particular entry with a value of the modified sequence number included in the data packet. For example, the PE device 1 may determine that the value of the modified sequence number is greater than the value of the sequence number included in the particular entry. The PE device 1 may determine that the end point device has moved from the PE device 1 to the PE device 2 based on the value of the modified sequence number being greater than the value of the sequence number included in the particular entry.

In some implementations, as further shown in FIG. 1F, and by reference number 150, the PE device 1 may store updated routing information for the end point device. For example, the PE device 1 may store the updated routing information for the device in the MAC table. In some implementations, the PE device 1 may generate a new entry for the end point device in the MAC table and may store an EVPN identifier identifying the EVPN, the MAC address of the end point device, information identifying the PE device 2 as the PE device through which the end point device can be reached, an Ethernet segment identifier (ESI) identifying the Ethernet segment connecting the CE device 2 to the PE device 2, and/or the modified sequence number.

In some implementations, rather than generating a new entry in the MAC table, the PE device 1 may modify an existing entry for the end point device in the MAC table. In this case, the PE device 1 may update, in the MAC table, the information identifying the PE device 1 as the PE device through which the end point device can be reached with information identifying the PE device 2 as the PE device through which the end point device can be reached, the Ethernet segment identifier (ESI) identifying the Ethernet segment connecting the CE device 1 to the PE device 1 with an Ethernet segment identifier (ESI) identifying the Ethernet segment connecting the CE device 2 to the PE device 2, and/or the sequence number with the modified sequence number included in the data packet.

In some implementations, when the data packet is sent to a plurality of PE devices included in the EVPN (e.g., the PE devices 1 and 3), after storing updated routing information for the end point device, each PE device, of the plurality of PE devices may begin forwarding packets destined for the end point device to the PE device 2 based on the updated routing information for the end point device prior to receiving a withdrawal of a previous route advertisement message. For example, the PE device 3 may begin forwarding packets destined for the end point device to the PE device 2 based on the updated routing information for the end point device prior to receiving a withdrawal of the route advertisement message sent by the PE device 1.

Because the updated routing information is transmitted via the data plane, the updated routing information may be propagated through the EVPN faster than if the updated routing information is transmitted via the control plane. Additionally, because each of the plurality of PE devices in the EVPN may begin forwarding packets destined for the end point device based on the updated routing information without waiting to receive a withdrawal of a previously transmitted route advertisement message (e.g., a withdrawal of the route advertisement message sent by the PE device 1), the amount of time for each of the plurality of PE devices to begin forwarding packets destined for the end point device based on the updated routing information is further reduced than if the plurality of PE devices waited to receive the withdrawal of the previously transmitted route advertisement message.

In this way, the updated routing information can be quickly propagated throughout the EVPN thereby reducing the amount of time in which the convergence process is completed (e.g., less than approximately 100 milliseconds rather than 2-4 seconds). The reduction in the amount of time in which the convergence process is completed may result in a reduced chance of a packet being dropped and/or forwarded to the wrong PE device as a result of a PE device having stale or incorrect routing information. A reduction in the chance of a packet being dropped and/or forwarded to the wrong PE device may conserve computing resources that would otherwise have been used to re-transmit and/or forward the packet to the correct PE device. A reduction in the chance of a packet being dropped and/or forwarded to the wrong PE device may prevent an increase in network congestion that would otherwise have occurred as a result of additional transmissions of the packet. The prevention of an increase in network congestion may allow various quality of service requirements to be met and/or maintained in the network, thereby improving the operation of the network.

In some implementations, each PE device that receives the data packet may determine not to forward the data packet to another device. For example, the data packet may have a format corresponding to an OAM packet defined for an EVPN overlay. The OAM packet may include a router alert bit. A PE device may determine that the router alert bit is set and may refrain from forwarding the OAM packet via the Ethernet segment associated with the PE device (e.g., to a CE device connected to the PE device) based on the router alert bit being set.

Figure 1G:
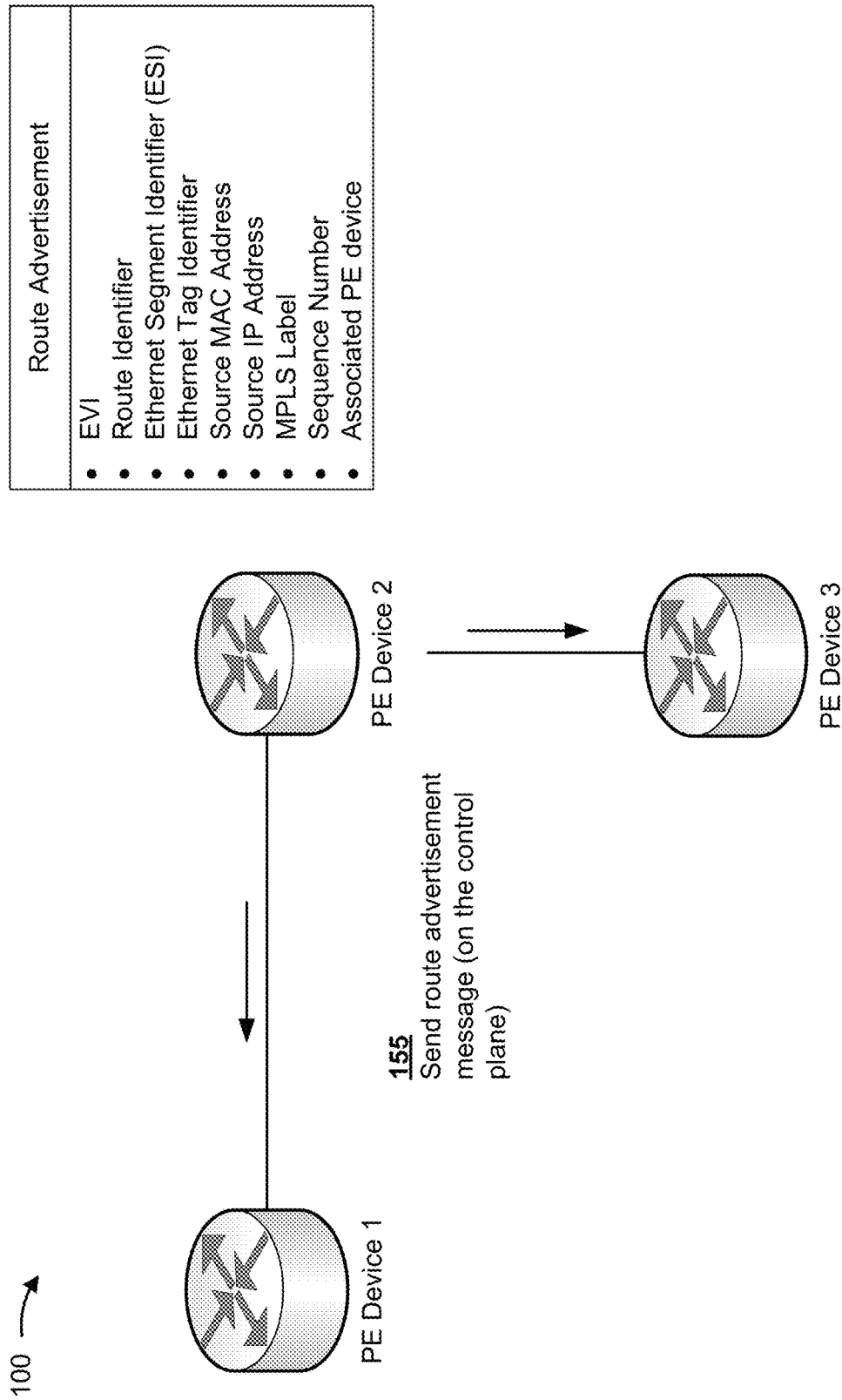

In some implementations, after sending the data packet via the data plane, the PE device 2 may propagate the updated routing information to other PE devices included in the EVPN via the control plane. For example, as shown in FIG. 1G, and by reference number 155, the PE device 2 may transmit, via the control plane, a route advertisement message to the PE devices 1 and 3 via the control plane of the EVPN.

In some implementations, the route advertisement message may include the EVPN identifier (EVI), the source MAC address, the IP address of the end point device, an Ethernet segment identifier identifying the Ethernet segment connecting the CE device 2 to the PE device 2, information identifying the PE device 2 as the PE device through which a device associated with the MAC address (e.g., the end point device) can be reached, and/or the modified sequence number. In some implementations, the route advertisement message may be an EVPN network layer reachability information (NLRI) message having route type field set to 2 to indicate a MAC/IP advertisement route type.

In some implementations where the data packet was sent to only the PE device 1, the PE device 3 may receive the route advertisement message transmitted by the PE device 2 and may process the route advertisement message to determine that the end point device has moved from the PE device 1 to the PE device 2 and update the routing information for the end point device in a manner similar to that described above with respect to FIG. 1F.

In implementations where the data packet was sent to only the PE device 1 (e.g., the PE device from which the end point device moved), the PE device 1 may also receive and process the route advertisement transmitted by the PE device 2. However, the PE device 1 may not update the routing information for the end point device based on receiving the route advertisement message because the routing information has already been updated based on the data packet transmitted via the data plane. As a result, the PE device 1 conserves computing resources that would have otherwise been used to update the routing information based on receiving the route advertisement message.

For example, the PE device 1 may receive the route advertisement message and may parse the route advertisement message to determine the MAC address and the modified sequence number included in the route advertisement message. The PE device 1 may compare the MAC address included in the route advertisement with MAC addresses stored in a data structure, such as a MAC table stored in a memory of the PE device 1. The PE device 1 may determine that the MAC address included in the data packet matches a MAC address included in a particular entry of the MAC table.

In some implementations, the particular entry may also include the modified sequence number included in the data packet received from the PE device 2 and the PE device 1 may compare the modified sequence number included in the particular entry with the modified sequence number included in the route advertisement message. The PE device 1 may determine that the routing information stored for the end point device is the current routing information for the end point device based on a result of the comparison.

In some implementations, the PE device 1 may determine that the routing information stored for the end point device is the current routing information for the end point device based on comparing a value of the modified sequence number included in the route advertisement message with a value of the modified sequence number included in the particular entry. For example, the PE device 1 may determine that the value of the modified sequence number included in the route advertisement message is the same as (e.g., equal to) the value of the modified sequence number included in the particular entry. The PE device 1 may determine that the routing information stored for the end point device is the current routing information based on the value of the modified sequence number in the route advertisement message being the same as the value of the sequence number included in the particular entry.

In some implementations, the PE device 1 may withdraw the route advertisement indicating that the end point device can be reached via the PE device 1 based on receiving the route advertisement message from the PE device 2. For example, the PE device 1 may transmit a withdrawal of the route advertisement indicating that the end point device can be reached via the PE device 1 to the other PE devices included in the EVPN (e.g., the PE devices 2 and 3) via the control plane of the EVPN.

In some implementations where the data packet was sent to a plurality of other PE devices included in the EVPN, each PE device that received the data packet may receive and process the route advertisement message and may not update the routing information for the end point device. For example, the PE devices 1 and 3 may determine that the routing information stored for the end point device is the current routing information for the end point device in a manner similar to that described above with respect to the PE device 1.

In these implementations, any PE device that did not receive the data packet may store updated routing information for the end point device in a manner similar to that described above with respect to the PE device 3. Additionally, the PE device 1 may withdraw the route advertisement indicating that the end point device can be reached via the PE device 1 in a manner similar to that described above with respect to the implementations where the data packet is sent only to the PE device from which the end point device moved.

Some implementations described herein describe a PE device included in an EVPN performing a fast convergence process that includes propagating updated routing information via a data plane based on determining that a device has moved from one PE device to another PE device and allowing each of the PE devices in the EVPN to begin forwarding packets destined for the device based on the updated routing information without waiting to receive a withdrawal of a previously transmitted route advertisement message. In this way, the updated routing information can be quickly propagated throughout the EVPN thereby reducing the amount of time in which the convergence process is completed. A reduction in the amount of time in which the convergence process is complete may lead to a conservation of computing resources and network resources as described above.

While some implementations are described herein in the context of an end point moving from one PE device to another PE device, in practice, these implementations also apply to one or more CE devices that move. For example, rather than or in addition to an end point device moving from being connected to a first CE device to being connected to a second CE device, a CE device may move from being connected to a first PE device to being connected to a second PE device. Such a move may cause routing information to be updated in the EVPN in a manner similar to that described above.

As indicated above, FIGS. 1A-1G are provided merely as one or more examples. Other examples may differ from what is described with regard to FIGS. 1A-1G.

Figure 2:
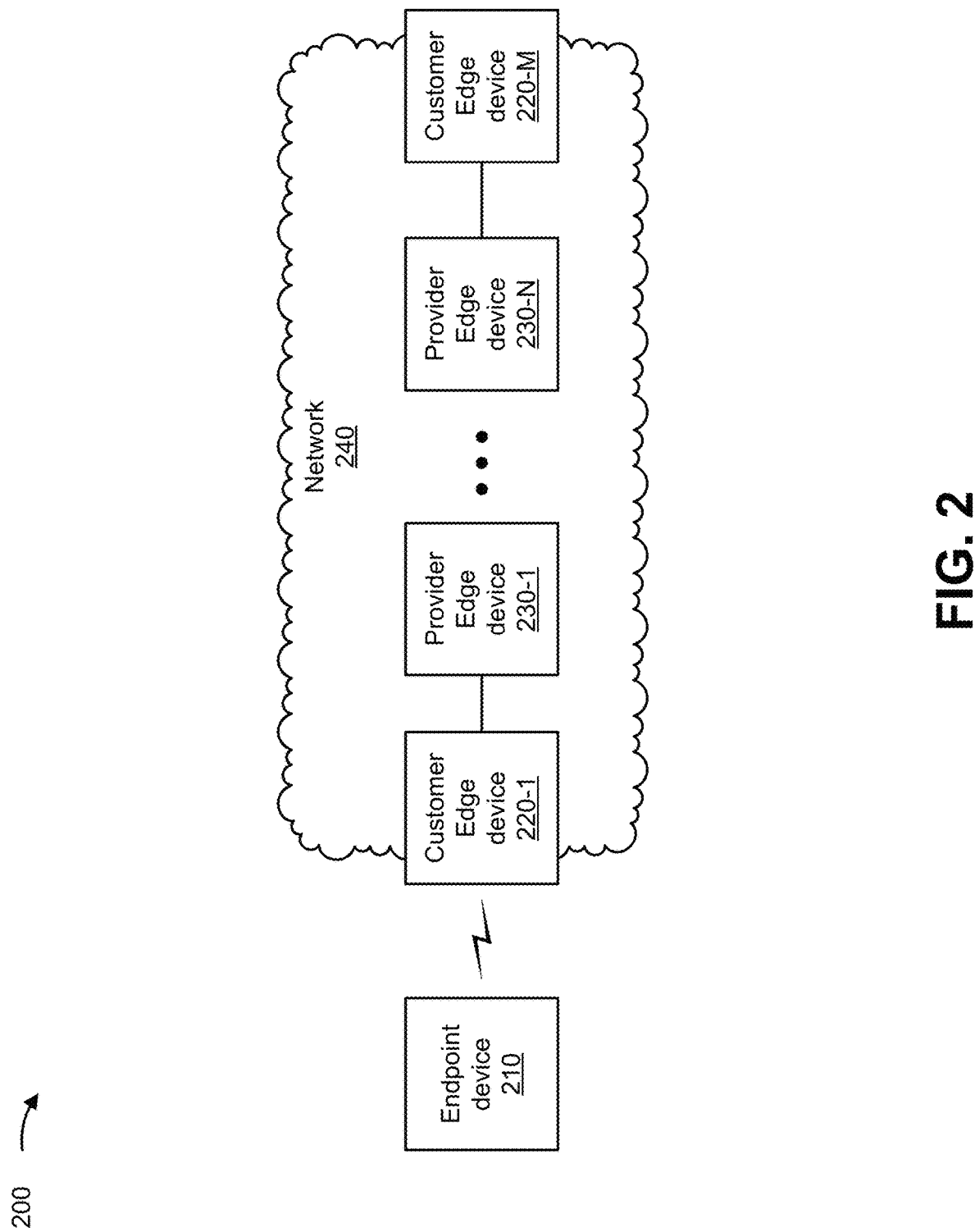
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include an end point device 210, one or more customer edge devices 220-1 through 220-M (M≥1) (hereinafter referred to collectively as "customer edge devices 220," and individually as "customer edge device 220"), one or more provider edge devices 230-1 through 230-N (N≥1) (hereinafter referred to collectively as "provider edge devices 230," and individually as "provider edge device 230"), and a network 240. Devices of environment 200 may interconnect via wired connections, wireless connections, or a combination of wired and wireless connections.

End point device 210 includes one or more devices capable of receiving, generating, storing, processing, and/or providing information, such as information described herein. For example, end point device 210 may include a mobile phone (e.g., a smart phone, a radiotelephone, etc.), a laptop computer, a tablet computer, a desktop computer, a handheld computer, a server device, a gaming device, a wearable communication device (e.g., a smart watch, a pair of smart glasses, a heart rate monitor, a fitness tracker, smart clothing, smart jewelry, a head mounted display, etc.), a network device, or a similar type of device. In some implementations, end point device 210 may receive network traffic from and/or may provide network traffic to other end point devices 210 via network 240 (e.g., by routing packets using customer edge devices 220 and/or provider edge devices 230 as intermediaries).

Customer edge device 220 includes one or more devices (e.g., one or more traffic transfer devices) capable of processing and/or transferring traffic. For example, customer edge device 220 may include a firewall, a router, a gateway, a switch, a hub, a bridge, a reverse proxy, a server (e.g., a proxy server), a security device, an intrusion detection device, a load balancer, or a similar type of device. In some implementations, customer edge device 220 may be connected to provider edge device 230 via a link, a plurality of links, one or more groups of links, and/or the like, as described elsewhere herein. In some implementations, customer edge device 220 may transmit traffic to end point device 210 and/or provider edge device 230 and receive traffic from end point device 210 and/or provider edge device 230, as described elsewhere herein. In some implementations, customer edge device 220 may be a physical device implemented within a housing, such as a chassis. In some implementations, customer edge device 220 may be a virtual device implemented by one or more computer devices of a cloud computing environment or a data center.

Provider edge device 230 includes one or more devices (e.g., one or more traffic transfer devices) capable of processing and/or transferring traffic. For example, provider edge device 230 may include a firewall, a router, a gateway, a switch, a hub, a bridge, a reverse proxy, a server (e.g., a proxy server), a security device, an intrusion detection device, a load balancer, or a similar type of device. In some implementations, provider edge device 230 may receive traffic from customer edge device 220 and/or another provider edge device 230 and may transmit traffic to customer edge device 220 and/or another provider edge device 230, as described elsewhere herein. In some implementations, provider edge device 230 may be a physical device implemented within a housing, such as a chassis. In some implementations, provider edge device 230 may be a virtual device implemented by one or more computer devices of a cloud computing environment or a data center.

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), an Ethernet network, an Ethernet virtual private network (EVPN), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
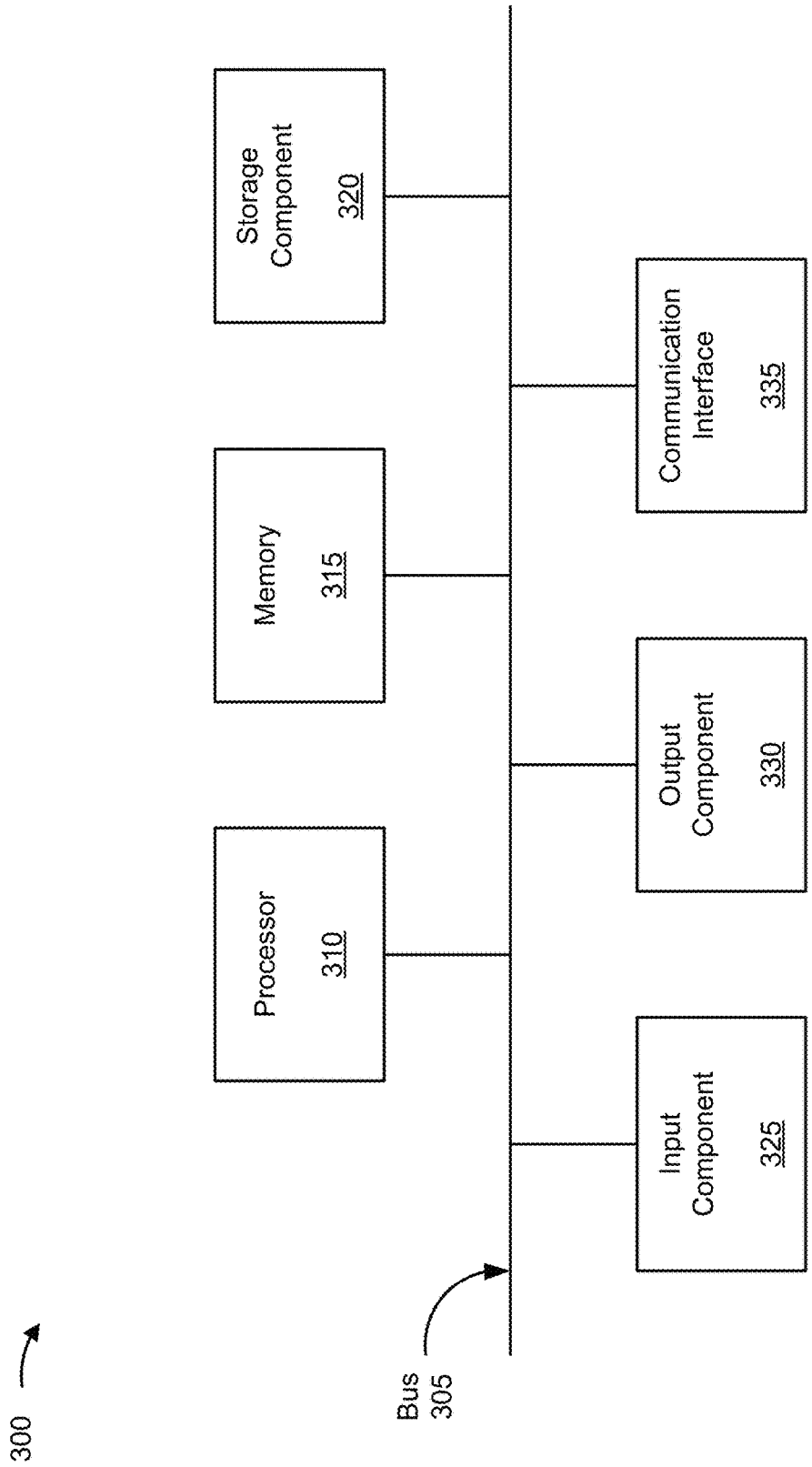
FIGS. 3A and 3B are diagrams of example components of one or more devices of FIG. 2.

FIG. 3A is a diagram of example components of a device 300. Device 300 may correspond to end point device 210, customer edge device 220, and/or provider edge device 230. In some implementations, end point device 210, customer edge device 220, and/or provider edge device 230 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
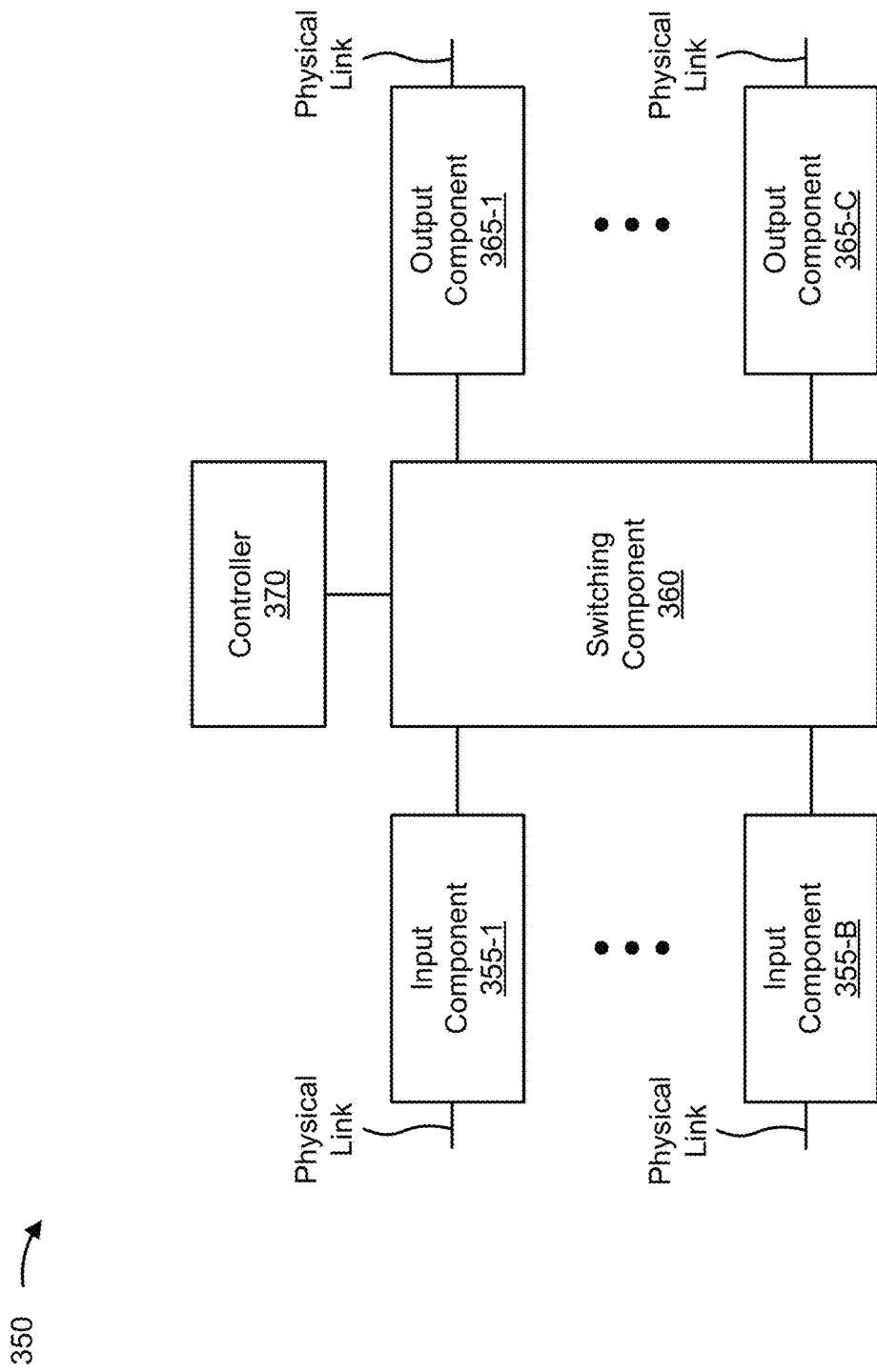

FIG. 3B is a diagram of example components of a device 350. Device 350 may correspond to one or more of end point device 210, customer edge device 220, and/or provider edge device 230. In some implementations, one or more of end point device 210, customer edge device 220, and/or provider edge device 230 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input components 355 may process incoming traffic, such as by performing data link layer encapsulation or decapsulation. In some implementations, input components 355 may send and/or receive packets. In some implementations, input components 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

FIG. 4 is a flow chart of an example process 400 for updating routing information based on determining that an end point device has moved from a first provider edge device to a second provider edge device. In some implementations, one or more process blocks of FIG. 4 may be performed by a first provider edge device (e.g., provider edge device 230). In some implementations, one or more process blocks of FIG. 4 may be performed by another device or a group of devices separate from or including the first provider edge device, such as a customer edge device (e.g., customer edge device 220), and/or the like.

As shown in FIG. 4, process 400 may include receiving device information from a second provider edge device included in the EVPN, the device information identifying a media access control (MAC) address, a sequence number associated with the MAC address, and an Ethernet segment associated with the second provider edge device, the device information indicating that a device, associated with the MAC address and the sequence number, is connected to the second provider edge device, and the device information being received via a control plane of the EVPN (block 402). For example, the first provider edge device (e.g., using processor 310, memory 315, storage component 320, input component 325, output component 330, communication interface 335, input component 355, switching component 360, output component 365, controller 370, and/or the like) may receive device information from a second provider edge device included in the EVPN, as described above. In some implementations, the device information may identify a media access control (MAC) address, a sequence number associated with the MAC address, and an Ethernet segment associated with the second provider edge device. In some implementations, the device information may indicate that a device, associated with the MAC address and the sequence number, is connected to the second provider edge device. In some implementations, the device information may be received via a control plane of the EVPN.

As further shown in FIG. 4, process 400 may include receiving, via an access port associated with the EVPN, data transmitted by the device, the data being received via a data plane of the EVPN (block 404). For example, the first provider edge device (e.g., using processor 310, memory 315, storage component 320, input component 325, output component 330, communication interface 335, input component 355, switching component 360, output component 365, controller 370, and/or the like) may receive data transmitted by the device, as described above. In some implementations, the data may be received via a data plane of the EVPN.

As further shown in FIG. 4, process 400 may include determining, based on information included in the data, that the data is associated with the MAC address and the sequence number (block 406). For example, the first provider edge device (e.g., using processor 310, memory 315, storage component 320, input component 325, output component 330, communication interface 335, input component 355, switching component 360, output component 365, controller 370, and/or the like) may determine, based on information included in the data, that the data is associated with the MAC address and the sequence number, as described above.

As further shown in FIG. 4, process 400 may include determining that the device has moved from the second provider edge device to the first provider edge device based on the data being associated with the MAC address and the sequence number (block 408). For example, the first provider edge device (e.g., using processor 310, memory 315, storage component 320, input component 325, output component 330, communication interface 335, input component 355, switching component 360, output component 365, controller 370, and/or the like) may determine that the device has moved from the second provider edge device to the first provider edge device based on the data being associated with the MAC address and the sequence number, as described above.

As further shown in FIG. 4, process 400 may include generating a data packet including mobility information, the mobility information indicating that the device has moved to the first provider edge device (block 410). For example, the first provider edge device (e.g., using processor 310, memory 315, storage component 320, input component 325, output component 330, communication interface 335, input component 355, switching component 360, output component 365, controller 370, and/or the like) may generate a data packet including mobility information, as described above. In some implementations, the mobility information may indicate that the device has moved to the first provider edge device.

As further shown in FIG. 4, process 400 may include transmitting the data packet to the second provider edge device via the data plane (block 412). For example, the first provider edge device (e.g., using processor 310, memory 315, storage component 320, input component 325, output component 330, communication interface 335, input component 355, switching component 360, output component 365, controller 370, and/or the like) may transmit the data packet to the second provider edge device via the data plane, as described above.

Process 400 may include additional implementations, such as any single implementation or any combination of implementations described below and/or in connection with one or more other processes described elsewhere herein.

In a first implementation, process 400 includes transmitting, after transmitting the data packet, at least a portion of the mobility information to the second provider edge device and a third provider edge device via the control plane.

In a second implementation, alone or in combination with the first implementation transmitting the data packet to the second provider edge device comprises unicasting the data packet to the second provider edge device.

In a third implementation, alone or in combination with one or more of the first and second implementations, the device comprises a first device, the data comprises first data, and the mobility information comprises first mobility information, and process 400 includes receiving, at the first provider edge device, second data transmitted by a second device, the second device being different from the first device, and determining, based on information included in the second data, that the second device has moved from a third provider edge device to the first provider edge device; wherein generating the data packet includes generating the data packet including the first mobility information and second mobility information, the second mobility information indicating that the second device has moved from the third provider edge device to the first provider edge device.

In a fourth implementation, alone or in combination with one or more of the first through third implementations, generating the data packet including the mobility information includes increasing a value of the sequence number to create a modified sequence number, and wherein the mobility information includes information identifying the MAC address, the modified sequence number, and an Ethernet segment associated with the first provider edge device.

In a fifth implementation, alone or in combination with one or more of the first through fourth implementations, the modified sequence number permits the second provider edge device to determine that the device is connected to the first provider edge device based on the modified sequence number being greater than the sequence number.

In a sixth implementation, alone or in combination with one or more of the first through fifth implementations, generating the data packet including the mobility information includes generating an Operations, Administration, and Maintenance (OAM) packet defined for an EVPN overlay, the OAM packet including a router alert bit, and setting the router alert bit to prevent the second provider edge device from forwarding the OAM packet via the Ethernet segment associated with the second provider edge device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
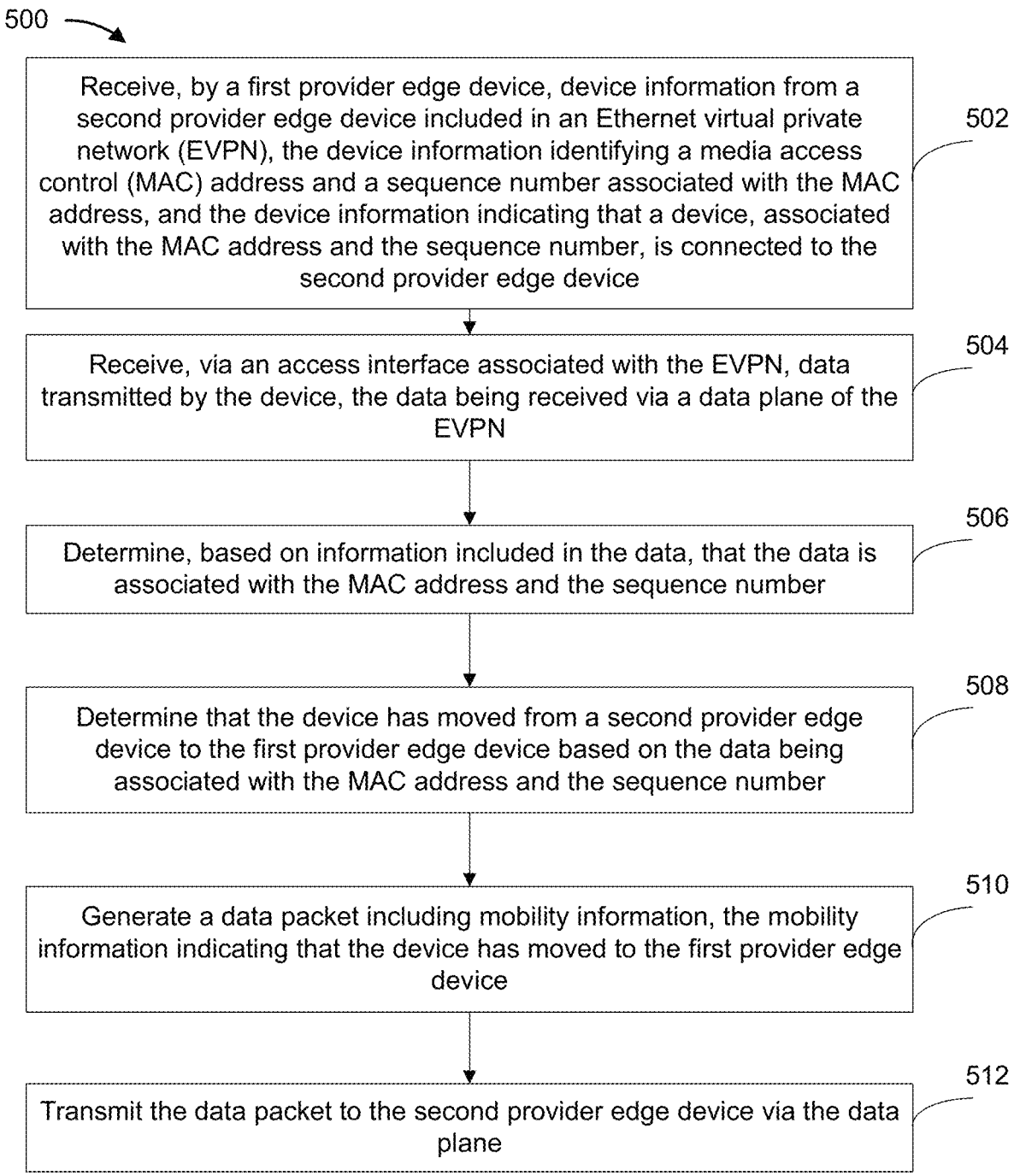
FIG. 5 is a flowchart of an example process for updating routing information based on determining that an end point device has moved from a first provider edge device to a second provider edge device.

FIG. 5 is a flow chart of an example process 500 for updating routing information based on determining that an end point device has moved from a first provider edge device to a second provider edge device. In some implementations, one or more process blocks of FIG. 5 may be performed by a first provider edge device (e.g., provider edge device 230). In some implementations, one or more process blocks of FIG. 5 may be performed by another device or a group of devices separate from or including the first provider edge device, such as another provider edge device (e.g., another provider edge device 230), a customer edge device (e.g., customer edge device 220), and/or the like.

As shown in FIG. 5, process 500 may include receiving device information from a second provider edge device included in the EVPN, the device information identifying a media access control (MAC) address and a sequence number associated with the MAC address, and the device information indicating that a device, associated with the MAC address and the sequence number, is connected to the second provider edge device (block 502). For example, the first provider edge device (e.g., using processor 310, memory 315, storage component 320, input component 325, output component 330, communication interface 335, input component 355, switching component 360, output component 365, controller 370, and/or the like) may receive device information from a second provider edge device included in the EVPN, as described above. In some implementations, the device information may identify a media access control (MAC) address and a sequence number associated with the MAC address. In some implementations, the device information may indicate that a device, associated with the MAC address and the sequence number, is connected to the second provider edge device.

As further shown in FIG. 5, process 500 may include receiving, via an access port associated with the EVPN, data transmitted by the device, the data being received via a data plane of the EVPN (block 504). For example, the first provider edge device (e.g., using processor 310, memory 315, storage component 320, input component 325, output component 330, communication interface 335, input component 355, switching component 360, output component 365, controller 370, and/or the like) may receive data transmitted by the device, as described above. In some implementations, the data may be received via a data plane of the EVPN.

As further shown in FIG. 5, process 500 may include determining, based on information included in the data, that the data is associated with the MAC address and the sequence number (block 506). For example, the first provider edge device (e.g., using processor 310, memory 315, storage component 320, input component 325, output component 330, communication interface 335, input component 355, switching component 360, output component 365, controller 370, and/or the like) may determine, based on information included in the data, that the data is associated with the MAC address and the sequence number, as described above.

As further shown in FIG. 5, process 500 may include determining that the device has moved from the second provider edge device to the first provider edge device based on the data being associated with the MAC address and the sequence number (block 508). For example, the first provider edge device (e.g., using processor 310, memory 315, storage component 320, input component 325, output component 330, communication interface 335, input component 355, switching component 360, output component 365, controller 370, and/or the like) may determine that the device has moved from the second provider edge device to the first provider edge device based on the data being associated with the MAC address and the sequence number, as described above.

As further shown in FIG. 5, process 500 may include generating a data packet including mobility information, the mobility information indicating that the device has moved to the first provider edge device (block 510). For example, the first provider edge device (e.g., using processor 310, memory 315, storage component 320, input component 325, output component 330, communication interface 335, input component 355, switching component 360, output component 365, controller 370, and/or the like) may generate a data packet including mobility information, as described above. In some implementations, the mobility information may indicate that the device has moved to the first provider edge device.

As further shown in FIG. 5, process 500 may include transmitting, via the data plane, the data packet to the second provider edge device to permit the second provider edge device to update routing information associated with the device (block 512). For example, the first provider edge device (e.g., using processor 310, memory 315, storage component 320, input component 325, output component 330, communication interface 335, input component 355, switching component 360, output component 365, controller 370, and/or the like) may transmit, via the data plane, the data packet to the second provider edge device to permit the second provider edge device to update routing information associated with the device, as described above.

Process 500 may include additional implementations, such as any single implementation or any combination of implementations described below and/or in connection with one or more other processes described elsewhere herein.

In a first implementation, process 500 includes transmitting, after transmitting the data packet, at least a portion of the mobility information to the second provider edge device via a control plane of the EVPN.

In a second implementation, alone or in combination with the first implementation, transmitting the data packet to the second provider edge device includes unicasting the data packet to the second provider edge device.

In a third implementation, alone or in combination with one or more of the first and second implementations, transmitting the data packet to the second provider edge device includes transmitting the data packet to a plurality of provider edge devices. In some implementations, the plurality of provider edge devices includes the second provider edge device.

In a fourth implementation, alone or in combination with one or more of the first through third implementations, generating the data packet including the mobility information includes modifying a value of the sequence number to create a modified sequence number. In some implementations, the mobility information includes information identifying the MAC address and the modified sequence number.

In a fifth implementation, alone or in combination with one or more of the first through fourth implementations, the modified sequence number permits the second provider edge device to determine that the device is connected to the first provider edge device based on the modified sequence number.

In a sixth implementation, alone or in combination with one or more of the first through fifth implementations, generating the data packet including the mobility information includes generating an Operations, Administration, and Maintenance (OAM) packet defined for an EVPN overlay, the OAM packet including a router alert bit, and setting the router alert bit to prevent the second provider edge device from forwarding the OAM packet via an Ethernet segment associated with the second provider edge device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
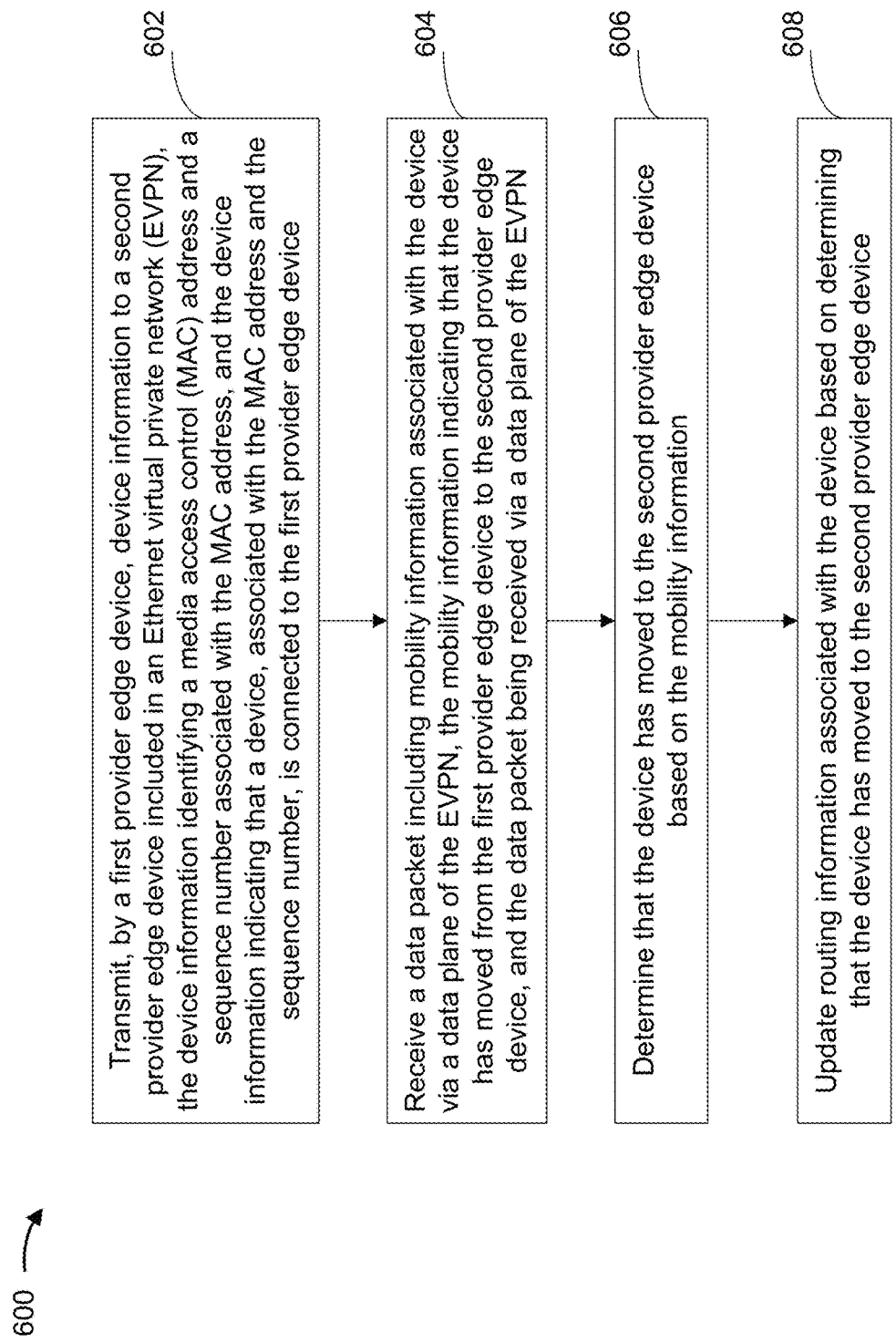
FIG. 6 is a flowchart of an example process for updating routing information based on determining that an end point device has moved from a first provider edge device to a second provider edge device.

FIG. 6 is a flow chart of an example process 600 for updating routing information based on determining that an end point device has moved from a first provider edge device to a second provider edge device. In some implementations, one or more process blocks of FIG. 6 may be performed by a first provider edge device (e.g., provider edge device 230). In some implementations, one or more process blocks of FIG. 6 may be performed by another device or a group of devices separate from or including the first provider edge device, such as another provider edge device (e.g., another provider edge device 230), a customer edge device (e.g., customer edge device 220), and/or the like.

As shown in FIG. 6, process 600 may include transmitting device information to a second provider edge device included in the EVPN, the device information identifying a media access control (MAC) address and a sequence number associated with the MAC address, and the device information indicating that a device, associated with the MAC address and the sequence number, is connected to the first provider edge device (block 602). For example, the first provider edge device (e.g., using processor 310, memory 315, storage component 320, input component 325, output component 330, communication interface 335, input component 355, switching component 360, output component 365, controller 370, and/or the like) may transmit device information to a second provider edge device included in the EVPN, as described above. In some implementations, the device information may identify a MAC address and a sequence number associated with the MAC address. In some implementations, the device information may indicate that a device, associated with the MAC address and the sequence number, is connected to the first provider edge device.

As further shown in FIG. 6, process 600 may include receiving a data packet including mobility information associated with the device, the mobility information indicating that the device has moved from the first provider edge device to the second provider edge device, and the data packet being received via a data plane of the EVPN (block 604). For example, the first provider edge device (e.g., using processor 310, memory 315, storage component 320, input component 325, output component 330, communication interface 335, input component 355, switching component 360, output component 365, controller 370, and/or the like) may receive a data packet including mobility information associated with the device, as described above. In some implementations, the mobility information may indicate that the device has moved from the first provider edge device to the second provider edge device. In some implementations, the data packet may be received via the data plane.

As further shown in FIG. 6, process 600 may include determining that the device has moved to the second provider edge device based on the mobility information (block 606). For example, the first provider edge device (e.g., using processor 310, memory 315, storage component 320, input component 325, output component 330, communication interface 335, input component 355, switching component 360, output component 365, controller 370, and/or the like) may determine that the device has moved to the second provider edge device based on the mobility information, as described above.

As further shown in FIG. 6, process 600 may include updating routing information associated with the device based on determining that the device has moved to the second provider edge device (block 608). For example, the first provider edge device (e.g., using processor 310, memory 315, storage component 320, input component 325, output component 330, communication interface 335, input component 355, switching component 360, output component 365, controller 370, and/or the like) may update routing information associated with the device based on determining that the device has moved to the second provider edge device, as described above.

Process 600 may include additional implementations, such as any single implementation or any combination of implementations described below and/or in connection with one or more other processes described elsewhere herein.

In a first implementation, the mobility information further indicates that another device has moved from a third provider edge device to the second provider edge device and process 600 includes determining, based on the mobility information, that the other device has moved from the third provider edge device to the second provider edge device; and updating routing information associated with the other device based on determining that the other device has moved from the third provider edge device to the second provider edge device.

In a second implementation, alone or in combination with the first implementation, the data packet is received as a unicast packet transmitted to the first provider edge device.

In a third implementation, alone or in combination with one or more of the first and second implementations, the data packet is received as a multicast packet transmitted to a plurality of provider edge devices, the plurality of provider edge devices including the first provider edge device.

In a fourth implementation, alone or in combination with one or more of the first through third implementations, the mobility information includes a modified sequence number, and determining that the device has moved to the second provider edge device includes determining that the device has moved to the second provider edge device based on the modified sequence number being greater than the sequence number.

In a fifth implementation, alone or in combination with one or more of the first through fourth implementations, process 600 includes receiving an Operations, Administration, and Maintenance (OAM) packet; determining that a router alert bit included in the OAM packet is set; and refraining from forwarding the OAM packet based on the router alert bit being set.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, the term packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first device associated with in an Ethernet virtual private network (EVPN), information associated with a second device,
      wherein the information associated with the second device includes at least one of a media access control (MAC) address, a sequence number associated with the MAC address, or network segment information associated with a third device associated with the EVPN;
   determining, by the first device, based on comparing the information with address information stored in a memory of the first device, and based on a first data packet received from the second device, that the first data packet is associated with the MAC address and the sequence number;
   determining, by the first device and based on determining that the first data packet is associated with the MAC address and the sequence number, that the second device transitioned from being associated with the third device to being associated with another device;
   generating, by the first device, a second data packet including information indicating that the second device transitioned from being associated with the first device to being associated with the third device; and
   transmitting, by the first device, the second data packet.

2. The method of claim 1, wherein generating the second data packet comprises:
   generating, based on increasing a value of the sequence number, a modified sequence number,
      wherein the second data packet comprises information identifying the MAC address, the modified sequence number, and information identifying a network segment associated with the first device.

3. The method of claim 1, wherein generating the second data packet comprises:
   generating, based on increasing a value of the sequence number, a modified sequence number,
      wherein determining that the second device has transitioned to being associated with the third device is based on the modified sequence number being greater than the sequence number is based on the modified sequence number.

4. The method of claim 1, wherein the first device is an edge device associated with a virtual private network,
   wherein the third device is another edge device associated with the virtual private network,
   wherein the second device is an end point device associated with the virtual private network, and
   wherein the information associated with the second device is received via a control plane of the virtual private network.

5. The method of claim 1, wherein generating the second data packet comprises:
   generating an Operations Administration and Maintenance (OAM) packet defined for a virtual private network overlay,
      wherein the OAM packet includes a router alert bit; and
   configuring the router alert bit to prevent the second device from forwarding the OAM packet via network segment associated with the second device.

6. The method of claim 1, further comprising:
   receiving, by the first device and from the third device, routing information; and
   storing, by the first device and based on determining that the second device transitioned from being associated with the first device to being associated with the third device, updated routing information.

7. The method of claim 1, wherein the first device is an edge device associated with a network,
   wherein the third device is another edge device associated with the network, and
   wherein transmitting the second data packet further comprises:
      transmitting the second data packet to the other edge device, or
      transmitting the second data packet to all edge devices associated with the network.

8. A first device, comprising:
   one or more memories; and
   one or more processors to:

store routing information received from a third device associated with an Ethernet virtual private network (EVPN);
receive information associated with a second device,
wherein the information associated with the second device includes at least one of a media access control (MAC) address, a sequence number associated with the MAC address, or network segment information associated with the third device;
determine, based on a first data packet received from the second device, that the first data packet is associated with the MAC address and the sequence number;
determine, based on comparing the information with address information stored in a memory of the first device, and based on determining that the data is associated with the MAC address and the sequence number, that the second device transitioned from being associated with the third device to being associated with the first device;
generate a second data packet including information indicating that the second device transitioned from being associated with the first device to being associated with the third device; and
transmit the second data packet.

9. The first device of claim 8, wherein the one or more processors, to generate the second data packet, are to:
generate, based on increasing a value of the sequence number, a modified sequence number,
wherein the second data packet comprises information identifying the MAC address, the modified sequence number, and information identifying a network segment associated with the first device.

10. The first device of claim 8, wherein the one or more processors, to generate the second data packet, are to:
generate, based on increasing a value of the sequence number, a modified sequence number,
wherein determining that the second device has transitioned to being associated with the third device is based on the modified sequence number being greater than the sequence number is based on the modified sequence number.

11. The first device of claim 8, wherein the first device is an edge device associated with a virtual private network,
wherein the third device is another edge device associated with the virtual private network,
wherein the second device is an end point device associated with the virtual private network, and
wherein the information associated with the second device is received via a control plane of the virtual private network.

12. The first device of claim 8, wherein the one or more processors, to generate the second data packet, are to:
generate an Operations Administration and Maintenance (OAM) packet defined for a virtual private network overlay,
wherein the OAM packet includes a router alert bit; and
configure the router alert bit to prevent the second device from forwarding the OAM packet via a network segment associated with the second device.

13. The first device of claim 8, wherein the one or more processors are further to:
store, based on determining that the second device transitioned from being associated with the first device to being associated with the third device, updated routing information.

14. The first device of claim 8, wherein the first device is an edge device associated with a network,
wherein the third device is another edge device associated with the network, and
wherein the one or more processors, to transmit the second data packet, are to:
transmit the second data packet to the other edge device, or
transmit the second data packet to all edge devices associated with the network.

15. A non-transitory computer-readable medium storing a set of instructions, the set of instructions comprising:
one or more instructions that, when executed by one or more processors of a first device, associated with an Ethernet virtual private network (EVPN), cause the first device to:
receive information associated with a second device,
wherein the information associated with the second device includes at least one of a media access control (MAC) address, a sequence number associated with the MAC address, or network segment information associated with a third device associated with the EVPN;
determine, based on comparing the information with address information stored in a memory of the first device, based on a first data packet received from the second device, that the first data packet is associated with the MAC address and the sequence number;
determine, based on determining that the first data packet is associated with the MAC address and the sequence number, that the second device transitioned from being associated with the third device to being associated with the first device;
generate a second data packet including information indicating that the second device transitioned from being associated with the first device to being associated with the third device; and
transmit the second data packet to one or more fourth devices that include the third device.

16. The non-transitory computer-readable medium of claim 15, wherein the one or more instructions, that cause the first device to generate the second data packet, cause the first device to:
generate, based on increasing a value of the sequence number, a modified sequence number,
wherein the second data packet comprises information identifying the MAC address, the modified sequence number, and information identifying a network segment associated with the first device.

17. The non-transitory computer-readable medium of claim 15, wherein the one or more instructions, that cause the first device to generate the second data packet, cause the first device to:
generate, based on increasing a value of the sequence number, a modified sequence number,
wherein determining that the second device has transitioned to being associated with the third device is based on the modified sequence number being greater than the sequence number is based on the modified sequence number.

18. The non-transitory computer-readable medium of claim 15, wherein the first device is an edge device associated with a virtual private network,
wherein the third device is another edge device associated with the virtual private network,
wherein the second device is an end point device associated with the virtual private network, and wherein the information associated with the second device is received via a control plane of the virtual private network.

19. The non-transitory computer-readable medium of claim 15, wherein the one or more instructions further cause the first device to:
   receive, from the third device, routing information; and
   store, based on determining that the second device transitioned from being associated with the first device to being associated with the third device, updated routing information.

20. The non-transitory computer-readable medium of claim 15, wherein the one or more instructions, that cause the first device to generate the second data packet, cause the first device to:
   generate an Operations Administration and Maintenance (OAM) packet defined for a virtual private network overlay,
      wherein the OAM packet includes a router alert bit; and
   configure the router alert bit to prevent the second device from forwarding the OAM packet via a network segment associated with the second device.

* * * * *